United States Patent
Lee et al.

(10) Patent No.: US 9,763,230 B2
(45) Date of Patent: Sep. 12, 2017

(54) METHOD AND APPARATUS FOR RECEIVING AND TRANSMITTING CHANNEL STATE INFORMATION BASED ON CARRIER SENSING

(75) Inventors: Seungmin Lee, Anyang-si (KR); Hanbyul Seo, Anyang-si (KR); Kijun Kim, Anyang-si (KR); Hakseong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 298 days.

(21) Appl. No.: 14/115,315

(22) PCT Filed: May 18, 2012

(86) PCT No.: PCT/KR2012/003956
§ 371 (c)(1),
(2), (4) Date: Nov. 1, 2013

(87) PCT Pub. No.: WO2012/157994
PCT Pub. Date: Nov. 22, 2012

(65) Prior Publication Data
US 2014/0071931 A1 Mar. 13, 2014

Related U.S. Application Data

(60) Provisional application No. 61/487,289, filed on May 18, 2011, provisional application No. 61/492,361, (Continued)

(51) Int. Cl.
*H04W 72/04* (2009.01)
*H04W 72/10* (2009.01)
(Continued)

(52) U.S. Cl.
CPC ........ *H04W 72/0413* (2013.01); *H04L 5/001* (2013.01); *H04L 5/0037* (2013.01);
(Continued)

(58) Field of Classification Search
CPC ............ H04W 72/10; H04W 72/0413; H04W 27/006; H04W 72/04; H04L 5/001; H04L 5/0037
(Continued)

(56) References Cited

U.S. PATENT DOCUMENTS 5,586,122 A * 12/1996 Suzuki .................... H04J 4/00
370/347
7,664,129 B2 * 2/2010 Takagi et al. ............. 370/437
(Continued)

FOREIGN PATENT DOCUMENTS

| JP | 7-162940 A | 6/1995 |
|---|---|---|
| JP | 9-187065 A | 7/1997 |
| JP | 2009-212968 A | 9/2009 |

*Primary Examiner* — Ian N Moore
*Assistant Examiner* — Mewale Ambaye
(74) *Attorney, Agent, or Firm* — Birch, Stewart, Kolasch & Birch, LLP

(57) ABSTRACT

The present invention relates to a wireless communication system and, more particularly, to a method and a device for transmitting control information. The wireless communication system supports carrier aggregation (CA). One aspect of the present invention relates to a method for a base station to receive information from a terminal in a wireless communication system, and comprises the steps of: dividing the entire bandwidth used by one or more serving cells configured in the base station and the terminal, into predetermined frequency units; carrying out a carrier sensing operation for each of the plurality of bandwidths divided in the predetermined frequency units; and when the result of the carrier sensing operation for a first bandwidth from the plurality of divided bandwidths is maintained idle for a predetermined time or longer, transmitting first information to the terminal using the first bandwidth; and receiving from the terminal, second information on a second cell (SCell) related to the first information from the one or more serving cells.

19 Claims, 29 Drawing Sheets

Related U.S. Application Data filed on Jun. 1, 2011, provisional application No. 61/505,098, filed on Jul. 6, 2011.

(51) Int. Cl.
  *H04W 84/12* (2009.01)
  *H04L 5/00* (2006.01)
  *H04L 27/00* (2006.01)

(52) U.S. Cl.
  CPC ......... *H04L 27/0006* (2013.01); *H04W 72/04* (2013.01); *H04W 72/10* (2013.01); *H04W 84/12* (2013.01)

(58) Field of Classification Search
  USPC ........................................................ 370/329
  See application file for complete search history.

(56) References Cited

U.S. PATENT DOCUMENTS

| | | | |
|---|---|---|---|
| 8,699,602 B2* | 4/2014 | Chen et al. .................. | 375/267 |
| 2007/0202882 A1* | 8/2007 | Ju ..................... | H04W 72/0413 455/450 |
| 2008/0080635 A1* | 4/2008 | Hugl et al. .................... | 375/267 |
| 2009/0196273 A1* | 8/2009 | Kwon .................... | H04W 8/30 370/343 |
| 2011/0044257 A1* | 2/2011 | Utsunomiya ....... | H04W 72/082 370/329 |

\* cited by examiner

FIG. 5
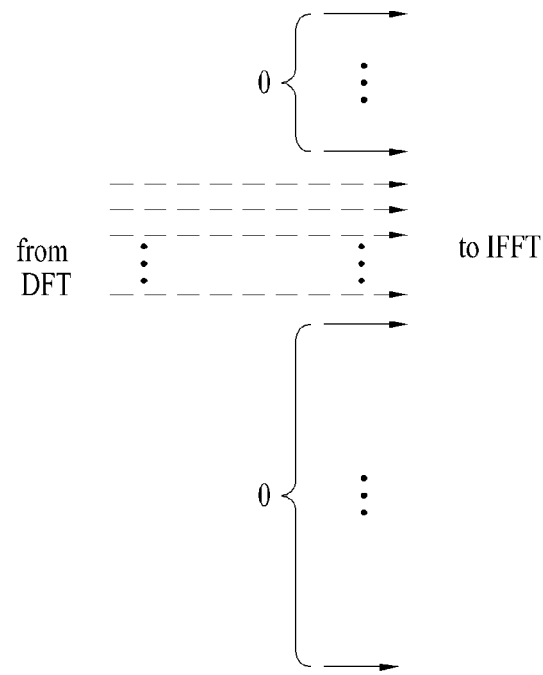
(a)
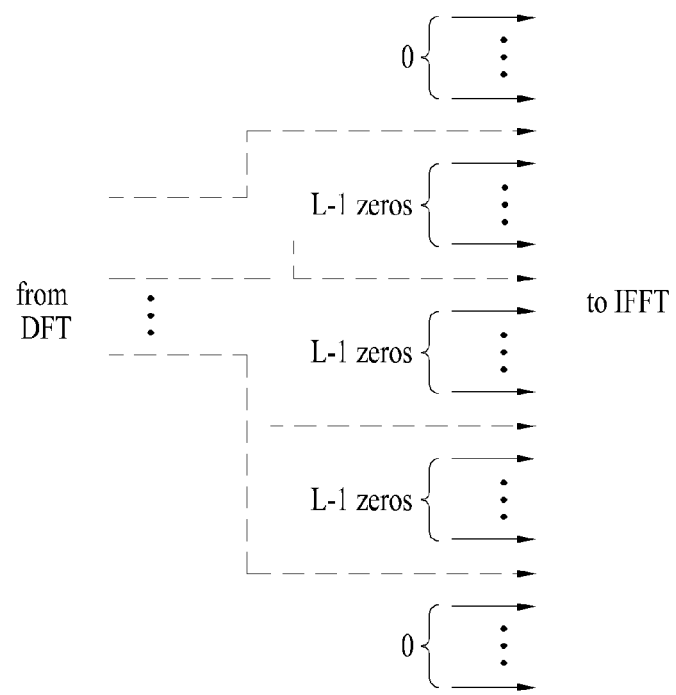
(b)

PUCCH format 1a and 1b structure (normal CP case)

PUCCH format 1a and 1b structure (extended CP case)

PUCCH format 2, 2a and 2b structure (normal CP case)

PUCCH format 2, 2a and 2b structure (extended CP case)

FIG. 17

Resource allocation: 18 ACK/NACK channels with normal CP $\triangle_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | n' = 0 | | 12 | n' = 0 | | 12 |
| 2 | 1 | | 6 | 13 | | 6 | 13 |
| 3 | 2 | 1 | | 14 | 1 | | 14 |
| 4 | 3 | | 7 | | | 7 | |
| 5 | 4 | 2 | | 15 | 2 | | 15 |
| 6 | 5 | | 8 | 16 | | 8 | 16 |
| 7 | 6 | 3 | | | 3 | | |
| 8 | 7 | | 9 | 17 | | 9 | 17 |
| 9 | 8 | 4 | | | 4 | | |
| 10 | 9 | | 10 | | | 10 | |
| 11 | 10 | 5 | | | 5 | | |
| 0 | 11 | | 11 | | | 11 | |

$\triangle_{shift}^{PUCCH} \in \{1,2,3\}$ for normal cyclic prefix
$\{1,2,3\}$ for extended cyclic prefix $\delta_{offset}^{PUCCH} \in \{0,1,...,\triangle_{shift}^{PUCCH} - 1\}$ Cell specific cyclic shift offset $n_{OC}$  Orthogonal sequence index for ACK/NACK
$\bar{n}_{OC}$  Orthogonal sequence index for RS
$n_{CS}$  Cell-specific Cyclic shift value of CAZAC sequence
    Cyclic shift value of a CAZAC sequence
n'  ACK/NACK resource index used for the channelization in a RB

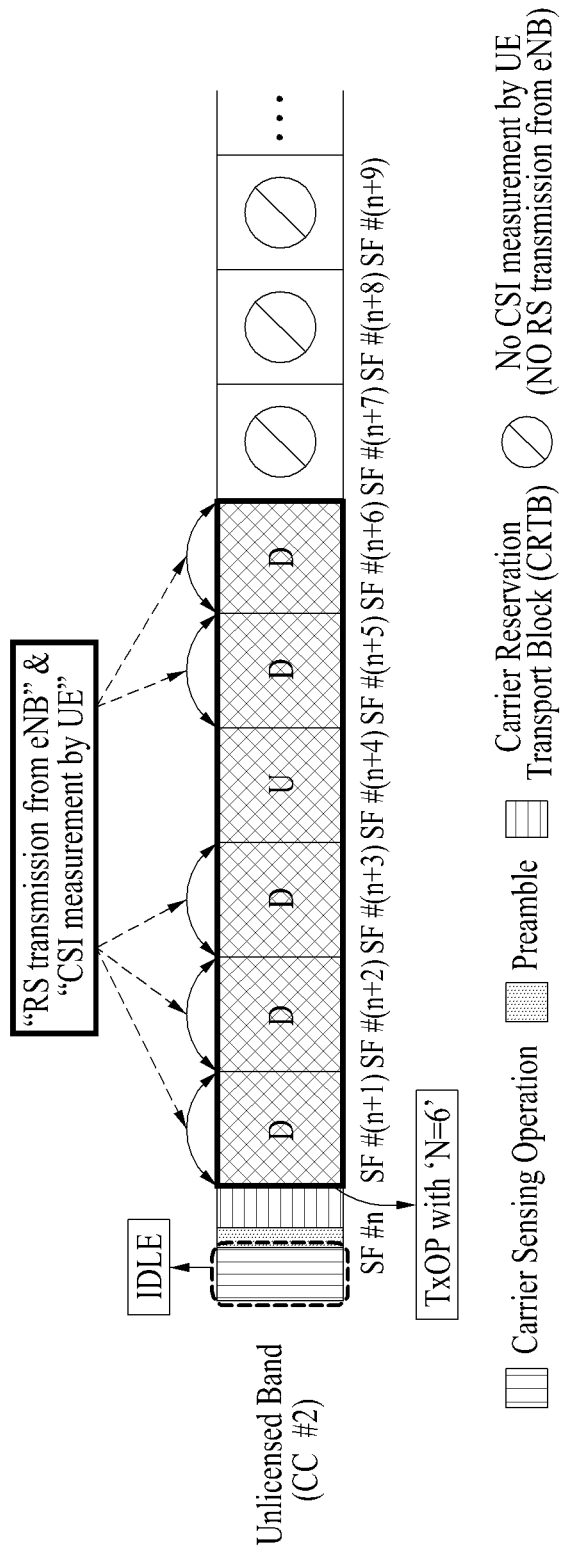

METHOD AND APPARATUS FOR RECEIVING AND TRANSMITTING CHANNEL STATE INFORMATION BASED ON CARRIER SENSING

CROSS REFERENCE TO RELATED APPLICATIONS

This non-provisional application is a National Stage entry under U.S.C. §371 of International Application No. PCT/KR2012/003956 filed on May 18, 2012, which claims the benefit of U.S. Provisional Application Nos. 61/487,289 filed on May 18, 2011, 61/492,361 filed on Jun. 1, 2011 and 61/505,098 filed on Jul. 6, 2011. The entire contents of all of the above applications are hereby incorporated by reference.

TECHNICAL FIELD

The present invention relates to a wireless communication system, and more specifically, to a method and device for transmitting control information. The wireless communication system supports carrier aggregation (CA).

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. Examples of the multiple access system include CDMA (code division multiple access), FDMA (frequency division multiple access), TDMA (time division multiple access), OFDMA (orthogonal frequency division multiple access), SC-FDMA (single carrier frequency division multiple access), etc.

DISCLOSURE

Technical Problem

An object of the present invention devised to solve the problem lies in a method for efficiently transmitting control information in a wireless communication system and a device for the same. Another object of the present invention is to provide a channel format, a signal processing method and a device for the same to efficiently transmit control information. Another object of the present invention is to provide a method for efficiently allocating resources for transmitting control information and a device for the same.

The technical problems solved by the present invention are not limited to the above technical problems and those skilled in the art may understand other technical problems from the following description.

Technical Solution

The object of the present invention can be achieved by providing a method for a base station to receive information from a user equipment (UE) in a wireless communication system, the method including: dividing the entire bandwidth used by one or more serving cells configured in the base station and the UE, into predetermined frequency units; carrying out a carrier sensing (CS) operation for each of the plurality of bandwidths divided into the predetermined frequency units; when a result of the CS operation for a first bandwidth from among the plurality of divided bandwidths is maintained idle for a predetermined time or longer, transmitting first information to the UE using the first bandwidth; and receiving, from the UE, second information on a second cell (SCell) related to the first information from among the one or more serving cells.

In another aspect of the present invention, provided herein is a method for a UE to transmit information to a base station in a wireless communication system, the method including: receiving first information from the base station using a first bandwidth from the entire bandwidth used by one or more serving cells configured in the base station and the UE; and transmitting, to the base station, second information on a secondary cell related to the first information from among the one or more serving cells, wherein the entire bandwidth is divided into predetermined frequency units, wherein the first bandwidth is a bandwidth maintained idle for a predetermined time or longer through a carrier sensing operation performed by the base station, from among the plurality of divided bandwidths.

In another aspect of the present invention, provided herein is a base station for receiving information from a UE in a wireless communication system, including: a processor configured to divide the entire bandwidth used by one or more serving cells configured in the base station and the UE, into predetermined frequency units and to carry out a carrier sensing (CS) operation for each of the plurality of bandwidths divided into the predetermined frequency units; a transmission module configured to transmit first information to the UE using a first bandwidth from among the plurality of divided bandwidths when a result of the CS operation for the first bandwidth is maintained idle for a predetermined time or longer; and a reception module configured to receive, from the UE, second information on a second cell related to the first information, from among the one or more serving cells.

In another aspect of the present invention, provided herein is a UE for transmitting information to a base station in a wireless communication system, including: a processor; a reception module configured to receive first information from the base station using a first bandwidth from the entire bandwidth used by one or more serving cells configured in the base station and the UE; and a transmission module configured to transmit to the base station, second information on a secondary cell related to the first information, from among the one or more serving cells, under the control of the processor, wherein the entire bandwidth is divided into predetermined frequency units, wherein the first bandwidth is a bandwidth maintained idle for a predetermined time or longer through a carrier sensing operation performed by the base station, from among the plurality of divided bandwidths.

Advantageous Effects

According to the present invention, control information can be efficiently transmitted in a wireless communication system. In addition, a channel format and a signal processing method for efficiently transmitting control information can be provided. Furthermore, resources for control information transmission can be efficiently allocated.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates examples of mapping input symbols to subcarriers in the frequency domain while satisfying single carrier property;

FIG. 17 illustrates ACK/NACK channelization for PUCCH formats 1a and 1b;

FIG. 38 illustrates another exemplary operation of the UE to generate CSI on CC #2 and measure interference.

BEST MODE

Figure 1:
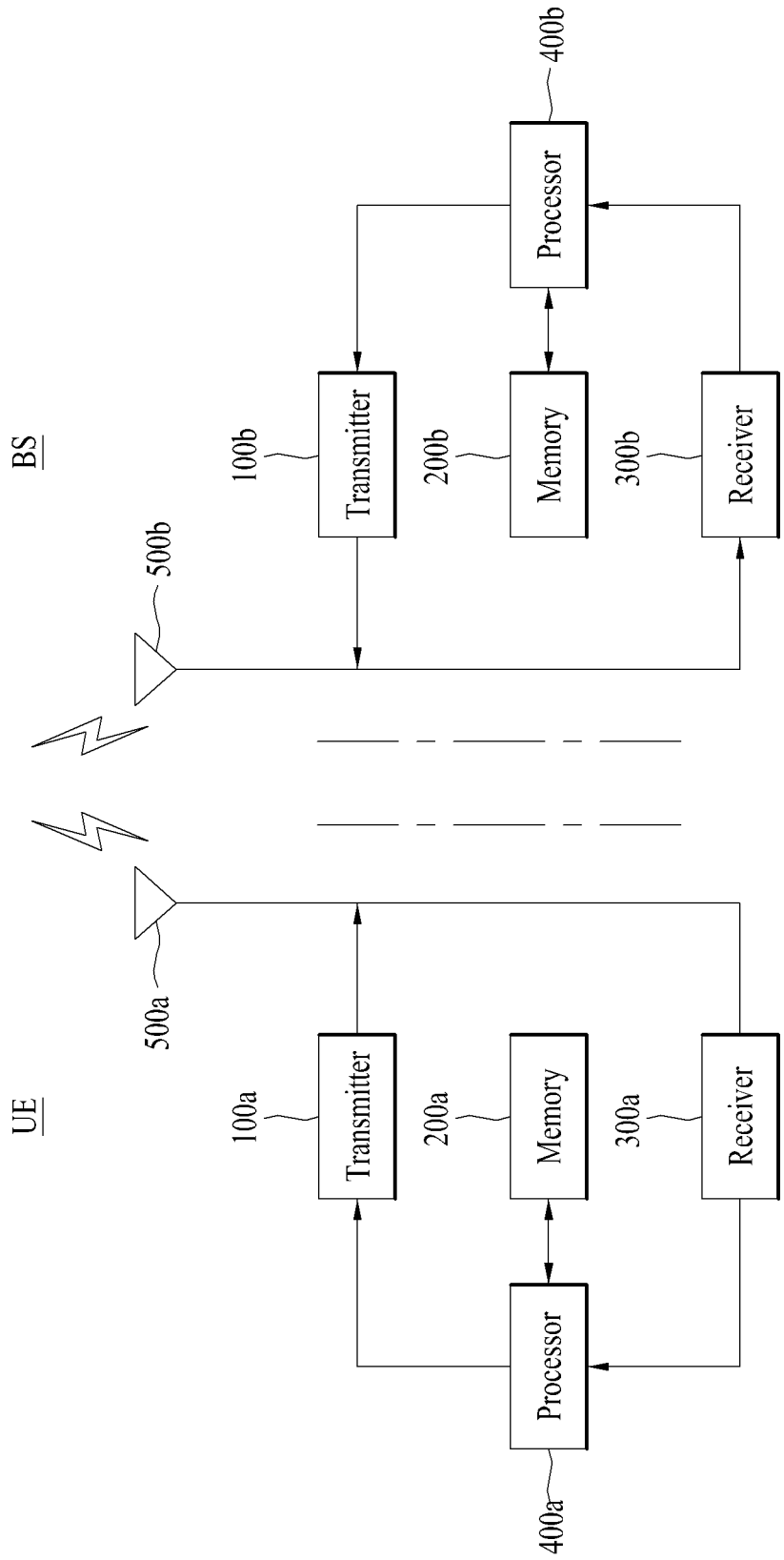
FIG. 1 illustrates configurations of a user equipment (UE) and a base station (BS) to which the present invention is applied.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

The embodiments of the present invention are applicable to a variety of wireless access systems such as CDMA (code division multiple access), FDMA (frequency division multiple access), TDMA (time division multiple access), OFDMA (orthogonal frequency division multiple access), SC-FDMA (single carrier frequency division multiple access), etc. CDMA can be implemented as a radio technology such as UTRA (universal terrestrial radio access) or CDMA2000. TDMA can be implemented as a radio technology such as GSM (global system for mobile communications)/GPRS (general packet radio service)/EDGE (enhanced data rates for GSM evolution). OFDMA can be implemented as a radio technology such as IEEE 802.11 (Wireless Fidelity (Wi-Fi)), IEEE 802.16 (Worldwide interoperability for Microwave Access (WiMAX)), IEEE 802-20, Evolved UTRA (E-UTRA), etc. UTRA is a part of UMTS (universal mobile telecommunications system). 3GPP LTE is a part of E-UMTS (evolved UMTS) using E-UTRA, employing OFDMA for downlink and SC-FDMA for uplink. 3GPP LTE adopts OFDMA on downlink and adopts SC-FDMA on uplink. LTE-A is an evolution of 3GPP LTE. For clarity, the following description focuses on 3GPP LTE/3GPP LTE-A. However, technical features of the present invention are not limited thereto. For example, although the following description is based on a wireless communication system corresponding to 3GPP LTE/LTE-A, the present invention is applicable to other wireless communication systems except for unique characteristics of 3GPP LTE/LTE-A.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'MA (mobile station)', 'MT (mobile terminal)', 'UT (user terminal)', 'SS (subscriber station)', 'wireless device', 'PDA (personal digital assistant)', 'wireless modem', 'handheld device', etc.

A BS is typically a fixed station that communicates with a UE and/or another BS. The BS exchanges data and control information with a UE and another BS. The term 'BS' may be replaced with 'eNB (evolved-Node B)', 'BTS (base transceiver system)', 'access point', etc.

In the present invention, allocation of a specific signal to a frame/subframe/slot/carrier/subcarrier refers to transmission of the specific signal through the corresponding carrier/subcarrier for the duration or at the timing of the corresponding frame/subframe/s lot.

In the present invention, a rank or a transport rank refers to the number of layers multiplexed or allocated to a single OFDM symbol or a single resource element.

In the present invention, PDCCH (physical downlink control channel)/PCFICH (physical control format indicator channel)/PHICH (physical hybrid automatic retransmit request indicator channel)/PDSCH (physical downlink shared channel) respectively refer to sets of resource elements carrying DCI (downlink control information)/CFI (control format indicator)/ACK/NACK (acknowledgement/negative ACK)/downlink data for uplink transmission.

In addition, PUCCH (physical uplink control channel)/PUSCH (physical uplink shared channel)/PRACH (physical random access channel) respectively refer to sets of resource elements carrying UCI (uplink control information)/uplink data/random access signal.

In particular, resource elements (REs) allocated or belonging to PDCCH/PCFICH/PHICH/PDSCH/PUCCH/PUSCH/PRACH are referred to as PDCCH/PCFICH/PHICH/PDSCH/PUCCH/PUSCH/PRACH REs or PDCCH/PCFICH/PHICH/PDSCH/PUCCH/PUSCH/PRACH resources.

Accordingly, transmission of PUCCH/PUSCH/PRACH by a UE corresponds to transmission of UCI/uplink data/random access signal on PUSCH/PUCCH/PRACH. In addition, transmission of PDCCH/PCFICH/PHICH/PDSCH by a BS corresponds to transmission of DCI/downlink data on PDCCH/PCFICH/PHICH/PDSCH.

Mapping of ACK/NACK information to a specific constellation point corresponds to mapping of the ACK/NACK information to a specific complex modulation symbol. In addition, mapping of ACK/NACK information to a specific complex modulation symbol corresponds to modulation of the ACK/NACK information into the specific complex modulation symbol.

FIG. 1 illustrates configurations of a UE and a BS to which the present invention is applicable. The UE serves as a transmitter on uplink and operates as a receiver on downlink. The BS operates as a receiver on uplink and functions as a transmitter on downlink.

Referring to FIG. 1, the UE and the BS respectively include antennas 500a and 500b for receiving information, data, signals or messages, transmitters 100a and 100b for transmitting information, data, signals or messages by controlling the antennas, receivers 300a and 300b for receiving information, data, signals or messages by controlling the antennas, and memories 200a and 200b temporarily or permanently storing information regarding the wireless communication system. In addition, the UE and the BS respectively include processors 400a and 400b connected to components such as the transmitters, receivers and memories and configured to control the components.

The transmitter 100a, the receiver 300a, the memory 200a and processor 400a included in the UE may be implemented as independent components by respective chips or two or more thereof may be implemented as a single chip. The transmitter 100b, the receiver 300b, the memory 200b and processor 400b included in the BS may be implemented as independent components by respective chips or two or more thereof may be implemented as a single chip. The transmitter and receiver may be integrated into a transceiver in the UE or BS.

The antennas 500a and 500b transmit signals generated in the transmitters 100a and 100b to the outside or receive external signals and deliver the received signals to the receivers 300a and 300b. The antennas 500a and 500b are also called antenna ports. An antenna port may correspond to a physical antenna or a combination of a plurality of physical antennas. A transceiver supporting MIMO (multiple input multiple output) for transmitting/receiving data using multiple antennas may be connected to two or more antennas.

The processors 400a and 400b control the overall operation of components or modules included in the UE or BS. Particularly, the processors 400a and 400b may execute various control functions for performing the present invention, a MAC (medium access control) frame variation control function according to service characteristics and propagation environment, a power saving mode function for controlling idle operation, a handover function, authentication and encoding functions, etc. The processors 400a and 400b may be called controllers, microcontrollers, microprocessors or microcomputers. The processors 400a and 400b may be implemented by hardware, firmware, software or a combination thereof.

In hardware implementation, ASICs (application specific integrated circuits), DSPs (digital signal processors), DSPDs (digital signal processing devices), PLDs (programmable logic devices), FPGAs (field programmable gate arrays), etc. configured to implement the present invention may be included in the processors 400a and 400b. In a firmware or software configuration, the embodiments of the present invention may be implemented in the form of a module, a procedure, a function, etc. Firmware or software configured to implement the present invention may be included in the processors 400a and 400b or stored in the memories 200a and 200b and executed by the processors 400a and 400b.

The transmitters 100a and 100b perform predetermined coding and modulation on a signal or data, which is scheduled by the processors 400a and 400b or a scheduler connected to the processors and transmitted to the outside, and transmit the modulated signal or data to the antennas 500a and 500b. The transmitters 100a and 100b and the receivers 300a and 300b of the UE and BS may be configured in a different manner according to a procedure of processing a transmitted signal and a received signal.

The memories 200a and 200b may store programs for processing and control of the processors 400a and 400b and temporarily store input/output information. Furthermore, the memories 200a and 200b may be used as buffers. The memories may be implemented using flash memory, a hard disc, a multimedia card micro type or card type memory (e.g. SD or XD memory), a random access memory (RAM), a static RAM (SRAM), a read-only memory (ROM), an electrically erasable programmable read-only memory (EEPROM), a programmable ROM (PROM), a magnetic memory, a magnetic disc, an optical disc, etc.

Figure 2:
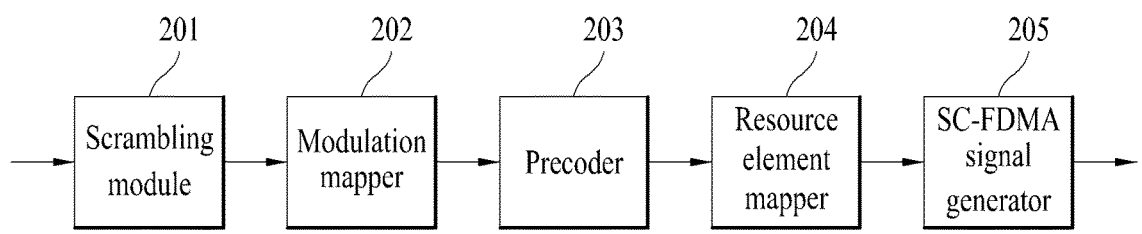
FIG. 2 illustrates a signal processing procedure through which a UE transmits an uplink signal.

FIG. 2 illustrates a signal processing procedure through which a UE transmits an uplink signal. Referring to FIG. 2, the transmitter 100a included in the UE may include a scrambling module 201, a modulation mapper 202, a precoder 203, a resource element mapper 204 and an SC-FDMA signal generator 205.

To transmit the uplink signal, the scrambling module 201 of the UE may scramble the uplink signal using a scramble signal. The scrambled signal is input to the modulation mapper 202 in which the scrambled signal is modulated into complex symbols using binary phase shift keying (BPSK), quadrature phase shift keying (QPSK) or 16-quadrature amplitude modulation (QAM)/64-QAM according to signal type and/or channel status. The modulated complex symbols are processed by the precoder 203, and then applied to the resource element mapper 204. The resource element mapper 204 may map the complex symbols to time-frequency resource elements. The signal processed in this manner may be subjected to the SC-FDMA signal generator 205 and transmitted to a BS through an antenna.

Figure 3:
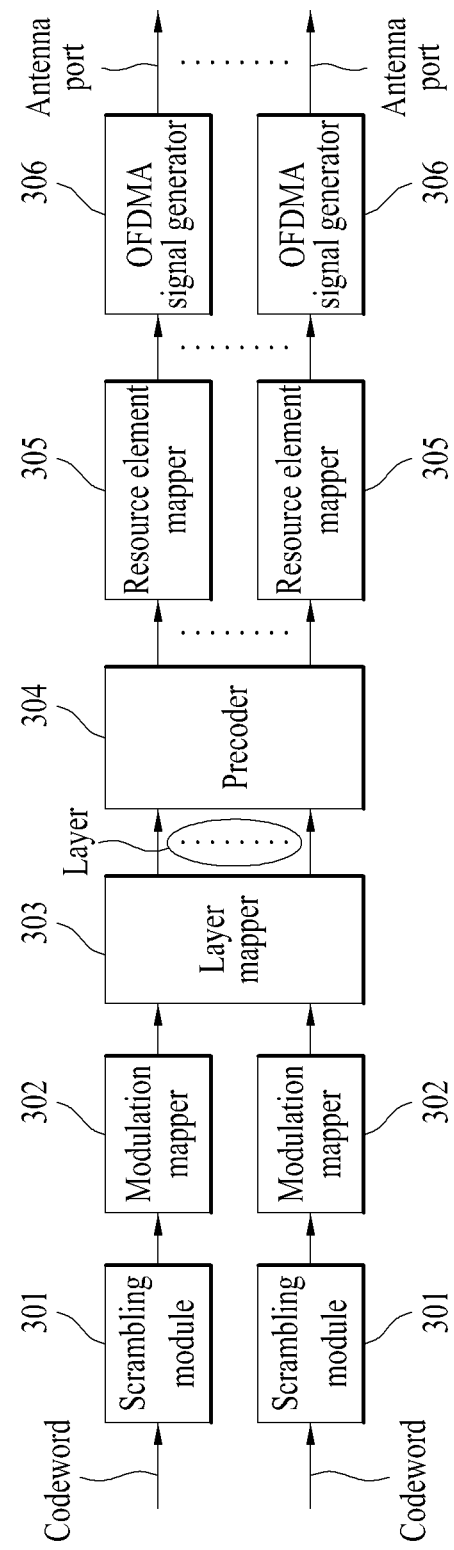
FIG. 3 illustrates a signal processing procedure through which a BS transmits a downlink signal.

FIG. 3 illustrates a signal processing procedure through which the BS transmits a downlink signal. Referring to FIG. 3, the transmitter 100b included in the BS may include a scrambling module 301, a modulation mapper 302, a layer mapper 303, a precoder 304, a resource element mapper 305 and an OFDMA signal generator 306.

To transmit a signal or one or more codewords on downlink, the signal or codewords may be modulated into complex symbols through the scrambling module 301 and the modulation mapper 302 as in the uplink shown in FIG. 2. Then, the complex symbols are mapped to a plurality of layers by the layer mapper 303. The layers may be multiplied by a precoding matrix in the precoder 304 and allocated to transport antennas. The processed signals for the respective antennas may be mapped to time-frequency resource elements by the resource element mapper 305 and subjected to the OFDM signal generator 306 to be transmitted through the antennas.

When the UE transmits an uplink signal in a wireless communication system, a peak-to-average ratio (PAPR) becomes a problem, as compared to a case in which the BS transmits a downlink signal. Accordingly, uplink signal transmission uses SC-FDMA while downlink signal transmission uses OFDMA, as described above with reference to FIGS. 2 and 3.

Figure 4:
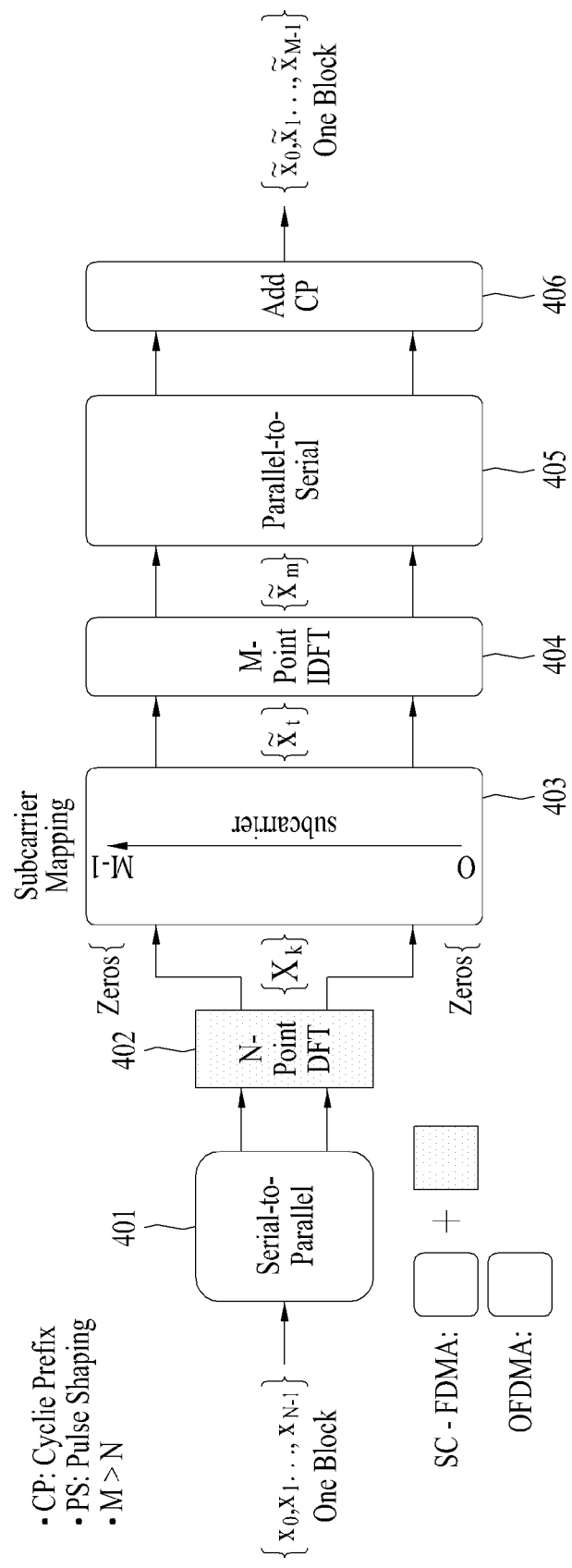
FIG. 4 illustrates SC-FDMA and OFDMA to which the present invention is applied.

FIG. 4 illustrates SC-FDMA and OFDMA to which the present invention is applied. 3GPP employs OFDMA on downlink and uses SC-FDMA on uplink.

Referring to FIG. 4, both a UE for transmitting an uplink signal and a BS for transmitting a downlink signal include a serial-to-parallel converter 401, a subcarrier mapper 403, an M-point IDFT module 404, and a cyclic prefix (CP) adder 406. The UE for transmitting a signal according to SC-FDMA additionally includes an N-point DFT module 402. The N-point DFT module 402 cancels some parts of the influence of IDFT of the M-point IDFT module 404 such that a transmission signal has single carrier property.

SC-FDMA needs to satisfy single carrier property. FIG. 5 illustrates examples of mapping input symbols to subcarriers in the frequency domain, which satisfies single carrier property. When DFT symbols are allocated to subcarriers according to one of FIGS. 5(a) and 5(b), a transmission signal satisfying single carrier property can be obtained. FIG. 5(a) illustrates a localized mapping scheme and FIG. 5(b) illustrates a distributed mapping scheme.

Figure 8:
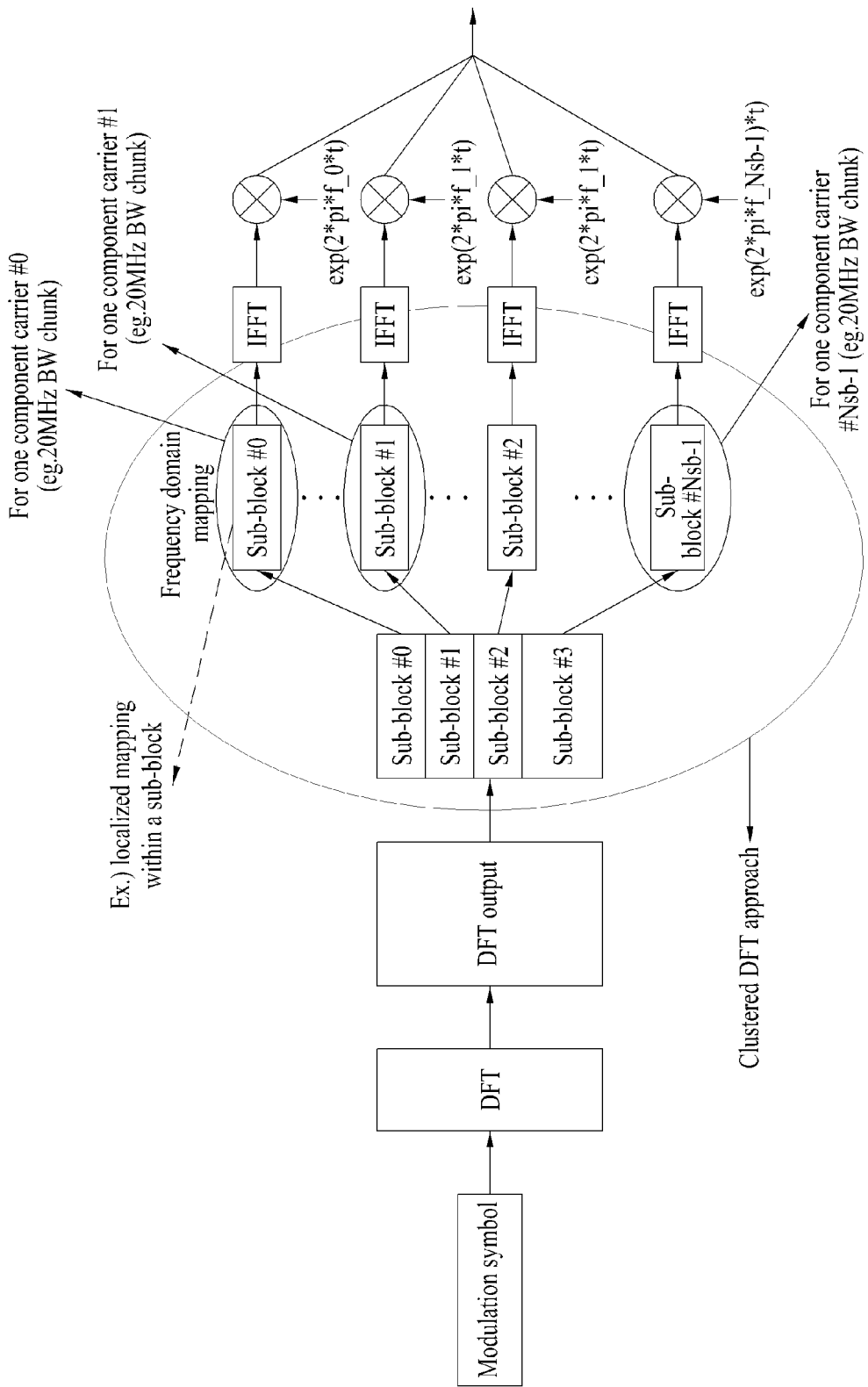

Clustered DFT-s-OFDM may be employed by the transmitters 100a and 100b. Clustered DFT-s-OFDM, which is a modified version of SC-FDMA, divides a signal that has passed through a precoder into several sub-blocks and discretely maps the sub-groups to subcarriers. FIG. 8 illustrates an example of mapping input symbols to a single carrier according to clustered DFT-s-OFDM.

Figure 6:
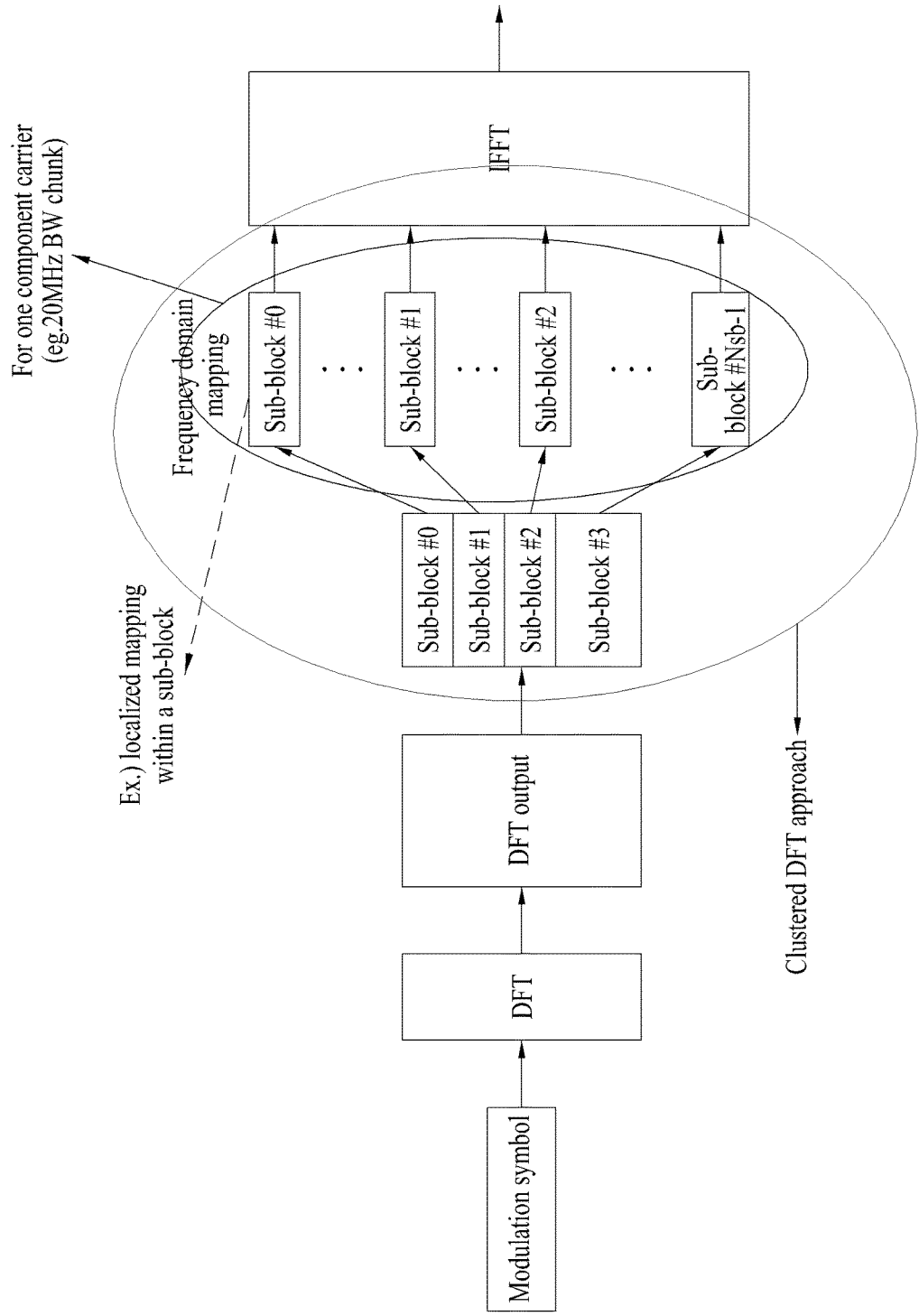
FIG. 6 illustrates a signal processing procedure for mapping DFT process output samples to a single carrier in clustered SC-FDMA.
Figure 7:
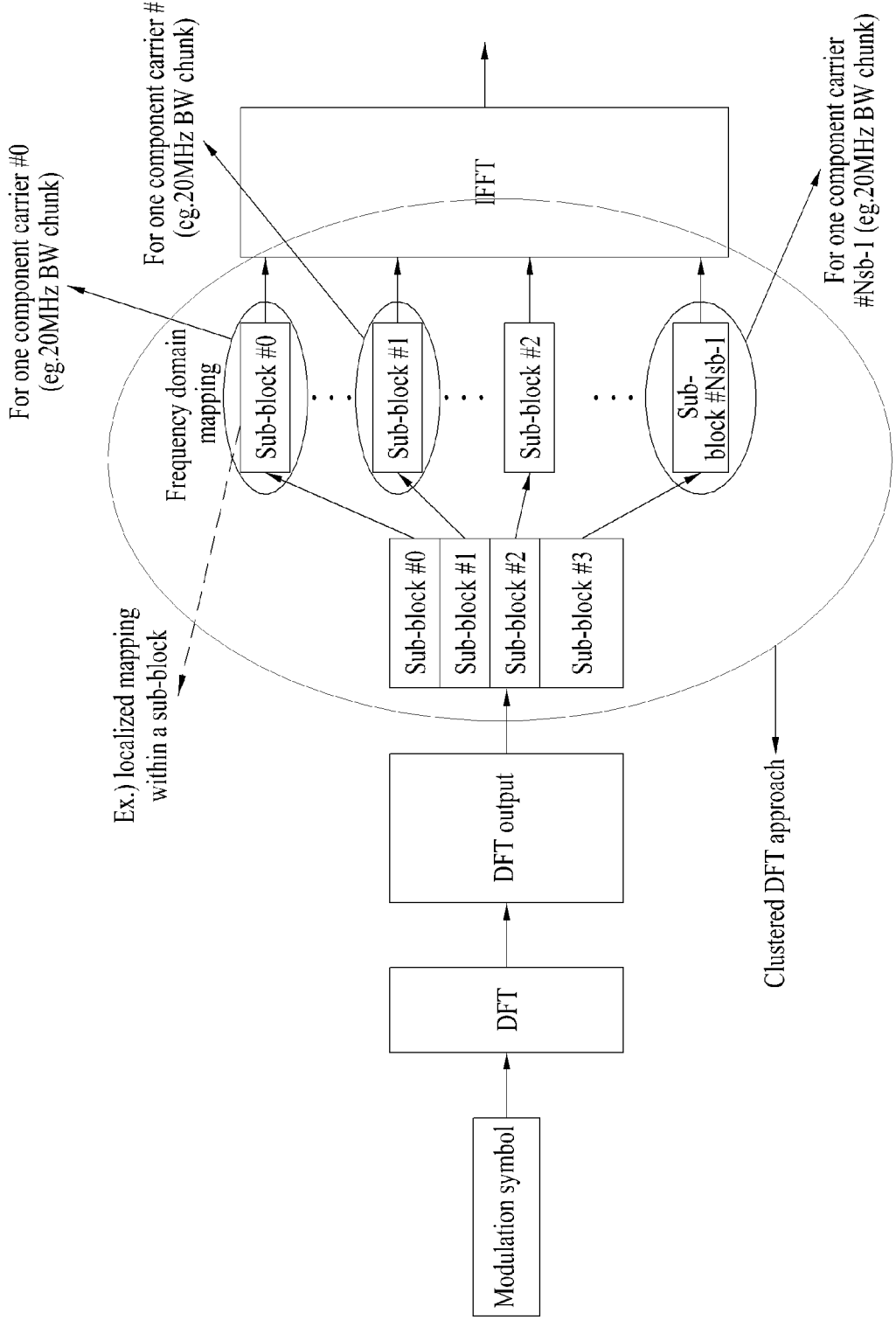
FIGS. 7 and 8 illustrate signal processing procedures for mapping DFT process output samples to multiple carriers in clustered SC-FDMA.

FIG. 6 illustrates a signal processing procedure for mapping DFT process output samples to a single carrier in clustered SC-FDMA. FIGS. 7 and 8 illustrate signal processing procedures for mapping DFT process output samples to multiple carriers in clustered SC-FDMA. FIG. 6 shows an example of application of intra-carrier clustered SC-FDMA while FIGS. 7 and 8 show examples of application of inter-carrier clustered SC-FDMA. FIG. 7 illustrates a case in which a signal is generated through a single IFFT block when subcarrier spacing between neighboring component carriers is set while component carriers are contiguously allocated in the frequency domain. FIG. 8 shows a case in which a signal is generated through a plurality of IFFT blocks when component carriers are non-contiguously allocated in the frequency domain.

Figure 9:
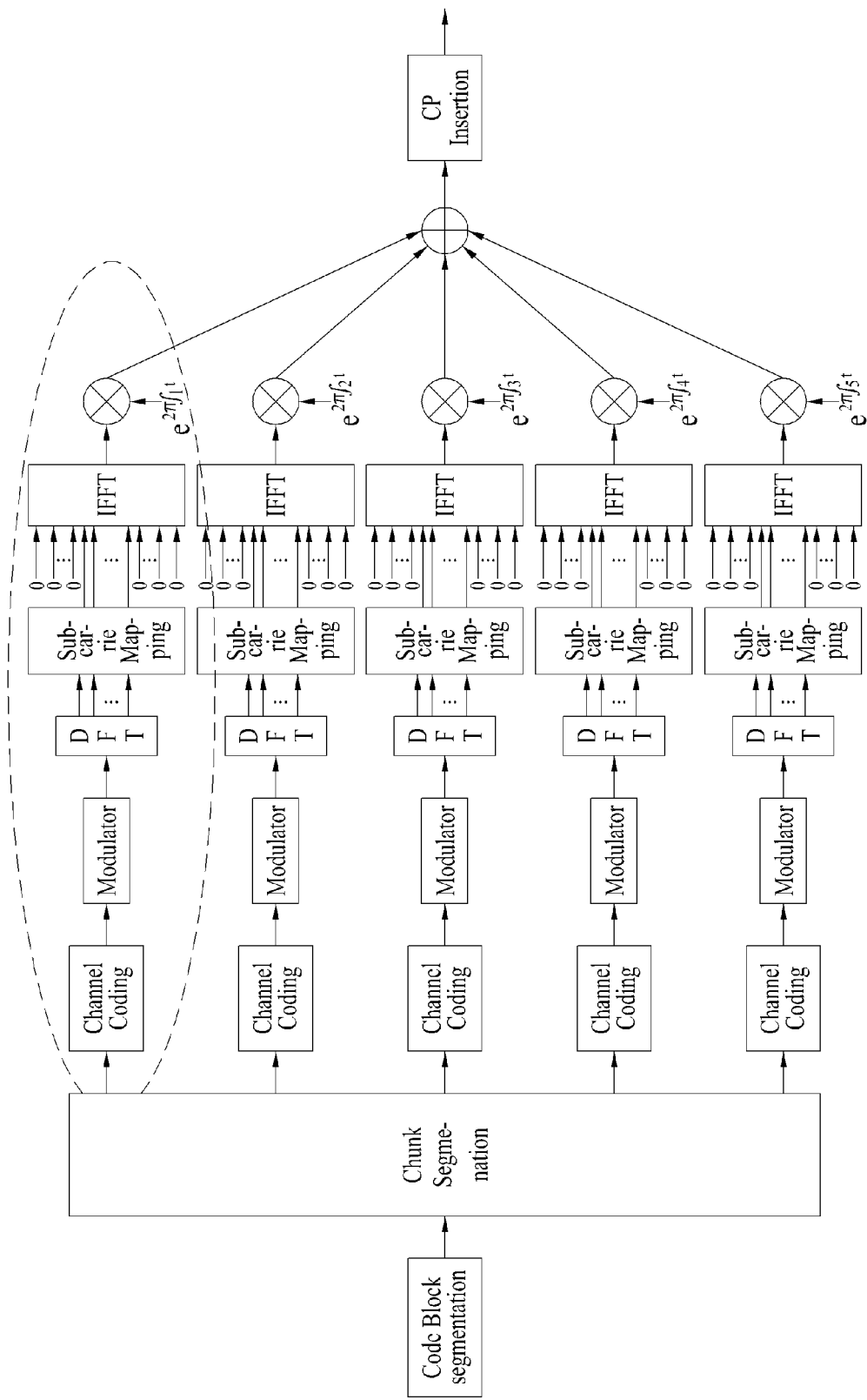
FIG. 9 illustrates a signal processing procedure of segmented SC-FDMA.

FIG. 9 illustrates a signal processing procedure in segmented SC-FDMA.

Segmented SC-FDMA is a simple extension of the DFT spreading and IFFT subcarrier mapping structure of the conventional SC-FDMA, when the number of DFT blocks is equal to the number of IFFT blocks and thus the DFT blocks and the IFFT blocks are in one-to-one correspondence. While the term 'segmented SC-FDMA' is adopted herein, it may also be called NxSC-FDMA or NxDFT-s-OFDMA. Referring to FIG. 9, the segmented SC-FDMA is characterized in that total time-domain modulation symbols are divided into N groups (N is an integer larger than 1) and a DFT process is performed on a group-by-group basis to relieve the single carrier property constraint.

Figure 10:
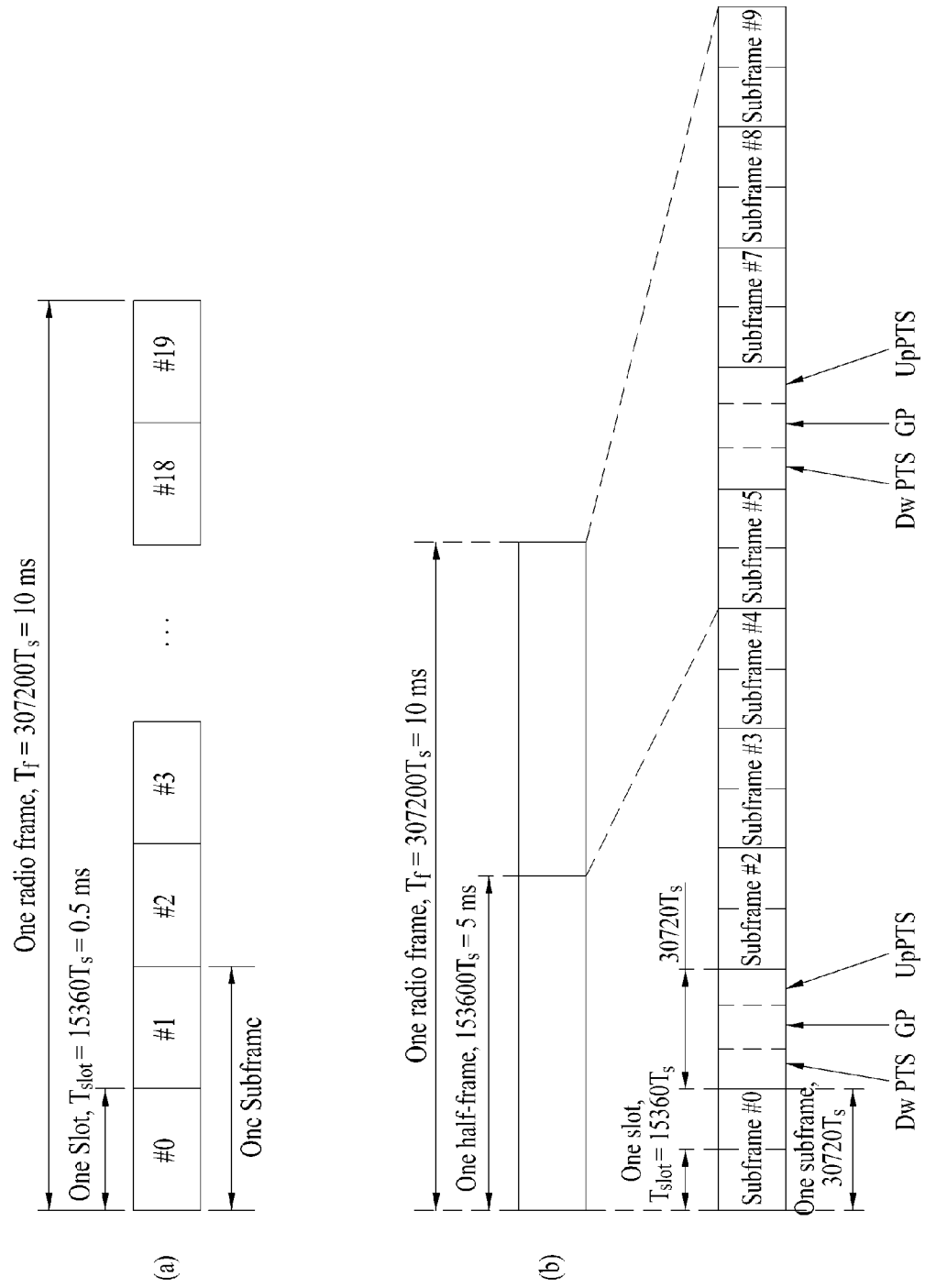
FIG. 10 illustrates exemplary radio frame structures used in a wireless communication system.

FIG. 10 illustrates exemplary radio frame structures used in a wireless communication system. FIG. 10(a) illustrates a radio frame according to frame structure type 1 (FS-1) of 3GPP LTE/LTE-A and FIG. 10(b) illustrates a radio frame according to frame structure type 2 (FS-2) of 3GPP LTE/LTE-A. The frame structure of FIG. 10(a) can be applied to FDD (frequency division duplex) mode and half FDD (H-FDD) mode. The frame structure of FIG. 10(b) can be applied to TDD (time division duplex) mode.

Referring to FIG. 10, a radio frame is 10 ms (307200Ts) long in 3GPP LTE/LTE-A, including 10 equally sized subframes. The 10 subframes of the radio frame may be numbered. Herein, $T_s$ is a sampling time, expressed as $T_s=1/(2048\times15\text{ kHz})$. Each subframe is 1 ms long, including two slots. The 20 slots of the radio frame may be sequentially numbered from 0 to 19. Each slot has a length of 0.5 ms. A time required to transmit one subframe is defined as a transmission time interval (TTI). Time resources may be identified by a radio frame number (or a radio frame index), a subframe number (or a subframe index), and a slot number (or a slot index).

Different radio frames may be configured for different duplex modes. For example, downlink transmission is distinguished from uplink transmission by frequency in the FDD mode. Therefore, a radio frame includes only downlink subframes or only uplink subframes.

On the other hand, since downlink transmission is distinguished from uplink transmission by time in the TDD mode, the subframes of a radio frame are divided into downlink subframes and uplink subframes.

Figure 11:
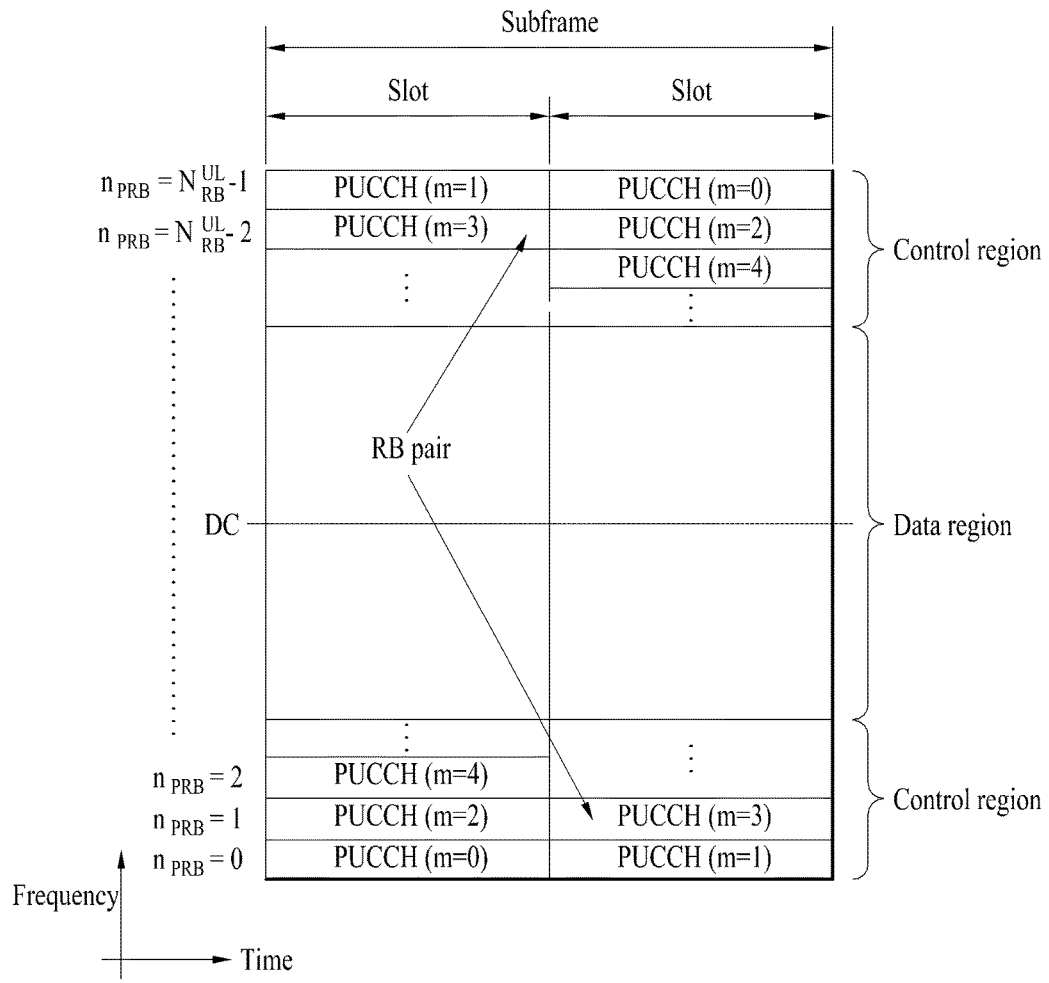
FIG. 11 illustrates an uplink subframe structure.

FIG. 11 illustrates an uplink subframe structure to which the present invention is applied. Referring to FIG. 11, an uplink subframe may be divided into a control region and a data region in the frequency domain. At least one PUCCH may be allocated to the control region to transmit uplink control information (UCI). In addition, at least one PUSCH may be allocated to the data region to transmit user data. If a UE adopts SC-FDMA in LTE release 8 or release 9, it cannot transmit a PUCCH and a PUSCH simultaneously in order to maintain the single carrier property.

UCI transmitted on a PUCCH differs in size and usage depending on PUCCH formats. The size of UCI may also vary according to coding rate. For example, the following PUCCH formats may be defined.

(1) PUCCH Format 1: used for On-Off keying (OOK) modulation and scheduling request (SR).

(2) PUCCH Formats 1a and 1b: used for transmission of ACK/NACK information.

1) PUCCH Format 1a: 1-bit ACK/NACK information modulated in BPSK

2) PUCCH Format 1b: 2-bit ACK/NACK information modulated in QPSK (3) PUCCH Format 2: modulated in QPSK and used for channel quality indicator (CQI) transmission.

(4) PUCCH Formats 2a and 2b: used for simultaneous transmission of a CQI and ACK/NACK information.

Table 1 lists modulation schemes and numbers of bits per subframe for PUCCH formats and Table 2 lists numbers of reference signals (RSs) per slot for PUCCH formats. Table 3 lists SC-FDMA symbol positions of RSs for PUCCH formats. In Table 1, PUCCH Formats 2a and 2b are for the case of a normal CP.

TABLE 1

| PUCCH Format | Modulation scheme | Number of Bits per Subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 2

| PUCCH Format | Normal CP | Extended CP |
| --- | --- | --- |
| 1, 1a, 1b | 3 | 2 |
| 2 | 2 | 1 |
| 2a, 2b | 2 | N/A |

TABLE 3

| | SC-FDMA Symbol Position of RS | |
| --- | --- | --- |
| PUCCH Format | Normal CP | Extended CP |
| 1, 1a, 1b | 2, 3, 4 | 2, 3 |
| 2, 2a, 2b | 1, 5 | 3 |

Subcarriers far from a DC (Direct Current) subcarrier are used for the control region in the uplink subframe. In other words, subcarriers at both ends of an uplink transmission bandwidth are allocated for transmission of UCI. The DC subcarrier is a component that is spared from signal transmission and mapped to carrier frequency $f_0$ during frequency upconversion performed by an OFDMA/SC-FDMA signal generator.

A PUCCH from one UE is allocated to an RB pair in a subframe and the RBs of the RB pair occupy different subcarriers in two slots. This PUCCH allocation is called frequency hopping of an RB pair allocated to a PUCCH over a slot boundary. However, if frequency hopping is not applied, the RB pair occupies the same subcarriers in two slots. Since a PUCCH from a UE is allocated to an RB pair in a subframe irrespective of frequency hopping, the same PUCCH is transmitted twice, each time in one RB of each slot in the subframe.

Hereinafter, an RB pair used for transmission of a PUCCH in a subframe is referred to as a PUCCH region. A PUCCH region and a code used therein are referred to as a PUCCH resource. That is, different PUCCH resources may have different PUCCH regions or may have different codes in the same PUCCH regions. For convenience, a PUCCH carrying ACK/NACK information is referred to as an ACK/NACK PUCCH, a PUCCH carrying CQI/PMI/RI information is referred to as a channel state information (CSI) PUCCH, and a PUCCH carrying SR information is referred to as an SR PUCCH.

A BS allocates PUCCH resources to a UE explicitly or implicitly, for transmission of UCI.

UCI such as ACK/NACK information, CQI information, PMI information, RI information, and SR information may be transmitted in the control region of an uplink subframe.

The UE and the BS transmit and receive signals or data from or to each other in the wireless communication system. When the BS transmits data to the UE, the UE decodes the received data. If data decoding is successful, the UE transmits an ACK to the BS. On the contrary, if data decoding fails, the UE transmits a NACK to the BS. The same applies to the opposite case, that is, the case where the UE transmits data to the BS. In the 3GPP LTE system, the UE receives a PDSCH from the BS and transmits an ACK/NACK for the received PDSCH on a PUCCH that is implicitly determined by a PDCCH carrying scheduling information for the PDSCH. A state in which the UE does not receive data may be regarded as a discontinuous transmission (DTX) state. In this case, the state may be processed as a case in which there is no received data according to a predetermined rule or a NACK case (in which decoding of data is not successful although the data is received).

Figure 12:
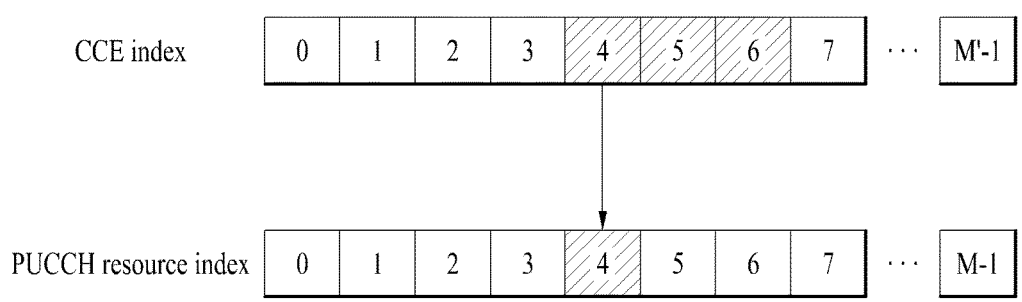
FIG. 12 illustrates a structure for determining a PUCCH for ACK/NACK transmission.

FIG. 12 illustrates a structure for determining a PUCCH for ACK/NACK transmission, to which the present invention is applied.

A PUCCH that will carry ACK/NACK information is not allocated to a UE in advance. Rather, a plurality of PUCCHs is used separately at each time instant by a plurality of UEs within a cell. Specifically, a PUCCH that a UE will use to transmit ACK/NACK information is implicitly determined on the basis of a PDCCH carrying scheduling information for a PDSCH that delivers downlink data. An entire area carrying PDCCHs in a downlink subframe includes a plurality of control channel elements (CCEs) and a PDCCH transmitted to a UE includes one or more CCEs. A CCE includes a plurality of (e.g. 9) resource element groups (REGs). One REG includes four contiguous REs except for an RS. The UE transmits ACK/NACK information on an implicit PUCCH that is derived or calculated by a function of a specific CCE index (e.g. the first or lowest CCE index) from among the indexes of CCEs included in a received PDCCH.

Referring to FIG. 12, the lowest CCE index of a PDCCH corresponds to a PUCCH resource index for ACK/NACK transmission. As illustrated in FIG. 12, on the assumption that a PDCCH including CCEs #4, #5 and #6 delivers scheduling information for a PDSCH to a UE, the UE transmits an ACK/NACK to a BS on a PUCCH, for example, PUCCH #4 derived or calculated using the lowest CCE index of the PDCCH, CCE index 4.

In the illustrated case of FIG. 12, there are up to M' CCEs in a downlink subframe and up to M PUCCHs in an uplink subframe. Although M may be equal to M', M may be different from M' and CCEs may be mapped to PUCCHs in an overlapping manner. For instance, a PUCCH resource index may be calculated by the following equation.

$$n^{(1)}_{PUCCH} = n_{CCE} + N^{(1)}_{PUCCH} \quad \text{[Equation 1]}$$

Here, $n^{(1)}_{PUCCH}$ denotes the index of a PUCCH resource for transmitting ACK/NACK information, $N^{(1)}_{PUCCH}$ denotes a signal value received from a higher layer, and $n_{CCE}$ denotes the lowest of CCE indexes used for transmission of a PDCCH.

Figure 13:
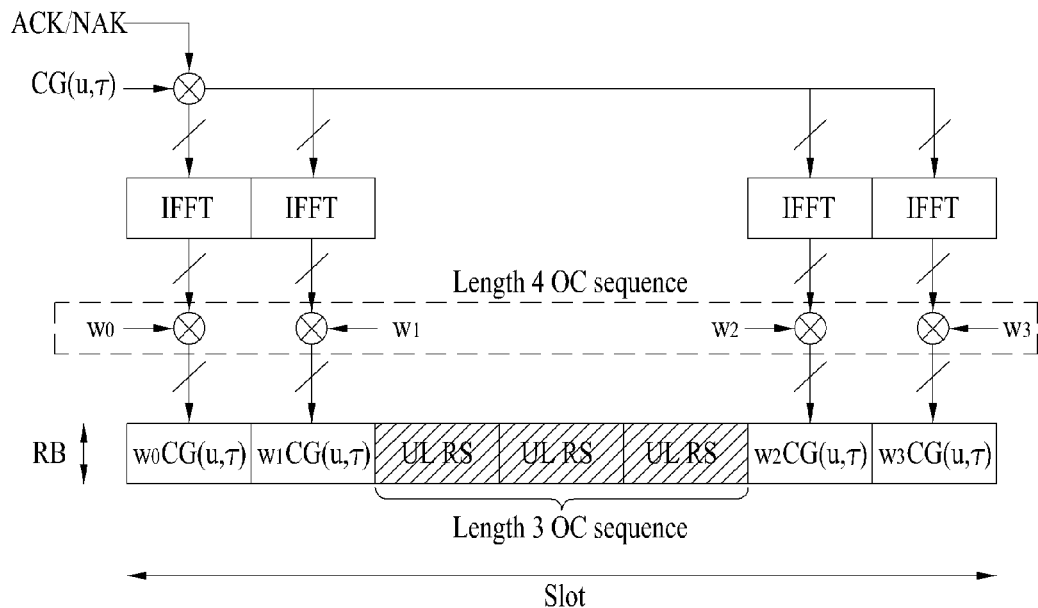
FIGS. 13 and 14 illustrate slot level structures of PUCCH formats 1a and 1b for ACK/NACK transmission.
Figure 14:
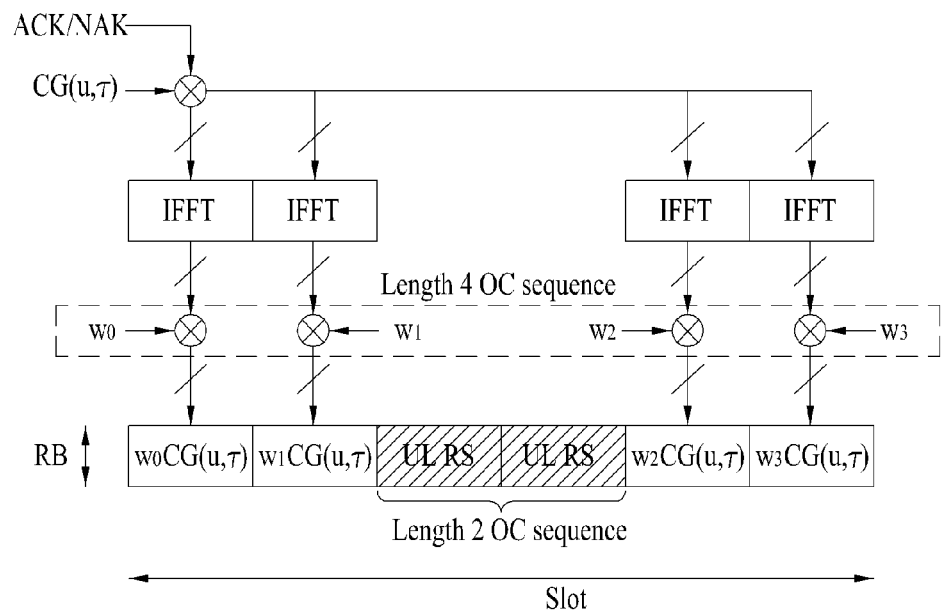

FIGS. 13 and 14 illustrate slot-level structures of PUCCH Formats 1a and 1b for ACK/NACK transmission.

FIG. 13 illustrates PUCCH Formats 1a and 1b in case of a normal CP and FIG. 14 illustrates PUCCH Formats 1a and 1b in case of an extended CP. The same UCI is repeated on a slot basis in a subframe in PUCCH Format 1a and 1b. A UE transmits an ACK/NACK signal in the resources of a different cyclic shift (CS) (a frequency-domain code) of a computer-generated constant amplitude zero auto correlation (CG-CAZAC) sequence and an orthogonal cover (OC) or orthogonal cover code (OCC) (a time-domain spreading code). The OC includes, for example, a Walsh/DFT orthogonal code. Given six CSs and three OCs, a total of 18 UEs may be multiplexed into the same PRB, for a single antenna. An OC sequence w0, w1, w2 and w3 is applicable to a time domain (after FFT modulation) or to a frequency domain (before FFT modulation). PUCCH Format 1 for transmitting SR information is the same as PUCCH Formats 1a and 1b in terms of slot-level structure and different from PUCCH Formats 1a and 1b in terms of modulation.

PUCCH resources composed of a CS, an OC, and a physical resource block (PRB) may be allocated to a UE by radio resource control (RRC) signaling, for transmission of SR information and an ACK/NACK for semi-persistent scheduling (SPS). As described before with reference to FIG. 12, PUCCH resources may be indicated to a UE implicitly using the lowest CCE index of a PDCCH corresponding to a PDSCH or the lowest CCE index of a PDCCH for SPS release, for dynamic ACK/NACK (or an ACK/NACK for non-persistent scheduling) feedback or ACK/NACK feedback for a PDCCH indicating SPS release.

Figure 15:
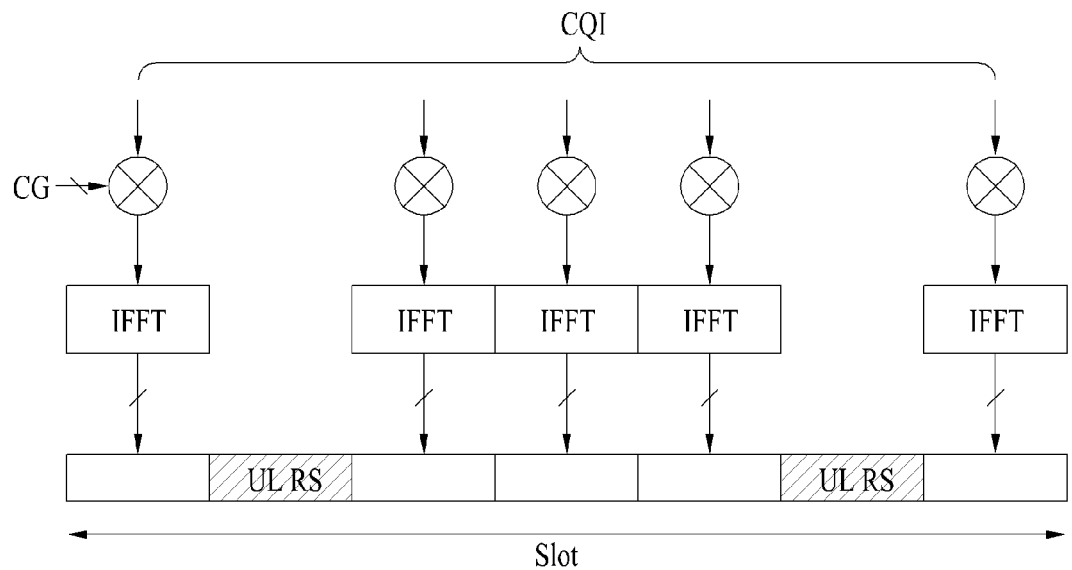
FIG. 15 illustrates PUCCH formats 2/2a/2b in a normal cyclic prefix (CP) case.
Figure 16:
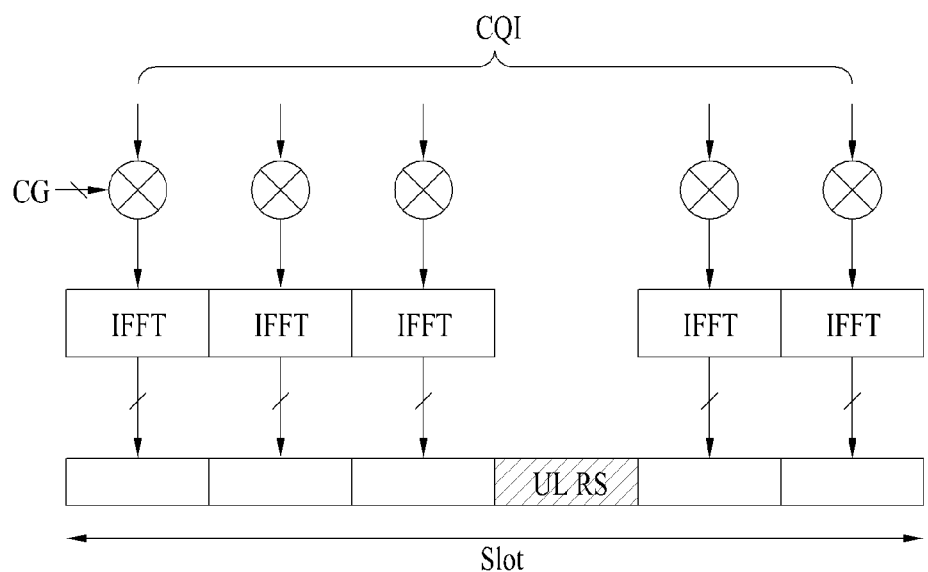
FIG. 16 illustrates PUCCH formats 2/2a/2b in an extended CP case.

FIG. 15 illustrates PUCCH Format 2/2a/2b in case of a normal CP and FIG. 16 illustrates PUCCH Format 2/2a/2b in case of an extended CP. Referring to FIGS. 15 and 16, one subframe includes 10 QPSK symbols except for an RS symbol in case of a normal CP. Each QPSK symbol is spread with a CS in the frequency domain and then mapped to a corresponding SC-FDMA symbol. SC-FDMA symbol-level CS hopping may be used to randomize inter-cell interference. An RS may be code division multiplexed (CDM) using a CS. For example, if there are 12 or 6 available CSs, 12 or 6 UEs may be multiplexed in the same PRB. That is, a plurality of UEs may be multiplexed using CS+OC+PRB and CS+PRB in PUCCH Formats 1/1a/1b and 2/2a/2b.

OCs of length 4 or length 3 for PUCCH Format 1/1a/1b are illustrated in Table 4 and Table 5 below.

TABLE 4

| Sequence Index | Orthogonal sequence |
|---|---|
| 0 | [+1 +1 +1 +1] |
| 1 | [+1 −1 +1 −1] |
| 2 | [+1 −1 −1 +1] |

TABLE 5

| Sequence Index | Orthogonal sequence |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

OCs for RSs in PUCCH Format 1/1a/1b are given in Table 6 below.

TABLE 6

| Sequence Index | Normal CP | Extended CP |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 illustrates ACK/NACK channelization for PUCCH Formats 1a and 1b. In FIG. 14, $\Delta_{shift}^{PUCCH}=2$.

Figure 18:
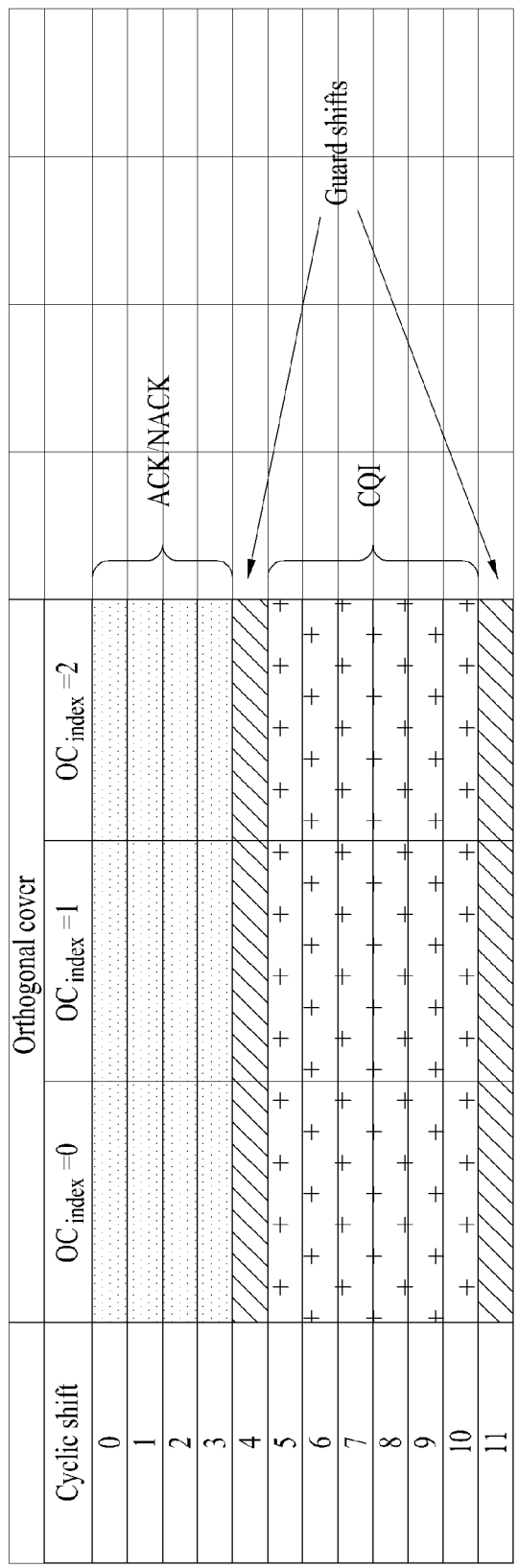
FIG. 18 illustrates channelization for a hybrid of PUCCH format 1/1a/1b and format 2/2a/2b in the same PRB.

FIG. 18 illustrates channelization for a hybrid structure of PUCCH Format 1/1a/1b and PUCCH Format 2/2a/2b in the same PRB.

CS hopping and OC re-mapping may be performed as follows.

(1) Symbol-based cell-specific CS hopping to randomize inter-cell interference (2) Slot-level CS/OS re-mapping 1) for randomization of inter-cell interference 2) slot-based approach for mapping between ACK/NACK channels and resources k Meanwhile, resources $n_r$ for PUCCH Format 1/1a/1b include the following combinations.

(1) CS (identical to DFT OC at symbol level) ($n_{cs}$)

(2) OC (OC at slot level) ($n_{oc}$)

(3) Frequency RB ($n_{rb}$)

Let the indexes of a CS, an OC, and an RB be denoted by $n_{cs}$, $n_{oc}$, and $n_{rb}$, respectively. Then, a representative index $n_r$ includes $n_{cs}$, $n_{oc}$, and $n_{rb}$. $n_r$ satisfies $n_r=(n_{cs}, n_{oc}, n_{rb})$.

A combination of an ACK/NACK and a CQI, PMI, RI and CQI may be delivered in PUCCH Format 2/2a/2b. Reed Muller (RM) channel coding may be applied.

For example, channel coding for an uplink CQI is described as follows in the LTE system. A bit stream $\alpha_0, \alpha_1, \alpha_2, \alpha_3, \ldots, \alpha_{A-1}$ is channel-encoded with a (20, A) RM code. Table 7 lists base sequences for the (20, A) code. $\alpha_0$ and $\alpha_{A-1}$ are the Most Significant Bit (MS) and Least Significant Bit (LSB), respectively. Aside from simultaneous transmission of a CQI and an ACK/NACK, up to 11 bits can be transmitted in case of an extended CP. A bit stream may be encoded to 20 bits by an RM code and then modulated in QPSK. Before QPSK modulation, the coded bits may be scrambled.

TABLE 7

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel-coded bits $b_0, b_1, b_2, b_3, \ldots, b_{B-1}$ may be generated by Equation 2.

$$b_i = \sum_{n=0}^{A-1} (a_n \cdot M_{i,n}) \bmod 2 \qquad \text{[Equation 2]}$$

Here, i=0, 1, 2, . . . , B−1.

Table 8 illustrates a UCI field for feedback of a broadband report (a single antenna port, transmit diversity, or open loop spatial multiplexing PDSCH) CQI.

TABLE 8

| Field | Bandwidth |
|---|---|
| Broadband CQI | 4 |

Table 9 illustrates a UCI field for feedback of a broadband CQI and a PMI. This field reports transmission of a closed loop spatial multiplexing PDSCH.

TABLE 9

| | Bandwidth | | | |
|---|---|---|---|---|
| | 2 antenna ports | | 4 antenna ports | |
| Field | Rank = 1 | Rank = 2 | Rank = 1 | Rank > 1 |
| Wideband CQI | 4 | 4 | 4 | 4 |
| Spatial-domain differential CQI | 0 | 3 | 0 | 3 |
| PMI | 2 | 1 | 4 | 4 |

Table 10 illustrates a UCI field to feedback an RI for a broadband report.

TABLE 10

| | Bit widths | | |
|---|---|---|---|
| | | 4 antenna ports | |
| Field | 2 antenna ports | Up to 2 layers | Up to 4 layers |
| RI | 1 | 1 | 2 |

Figure 19:
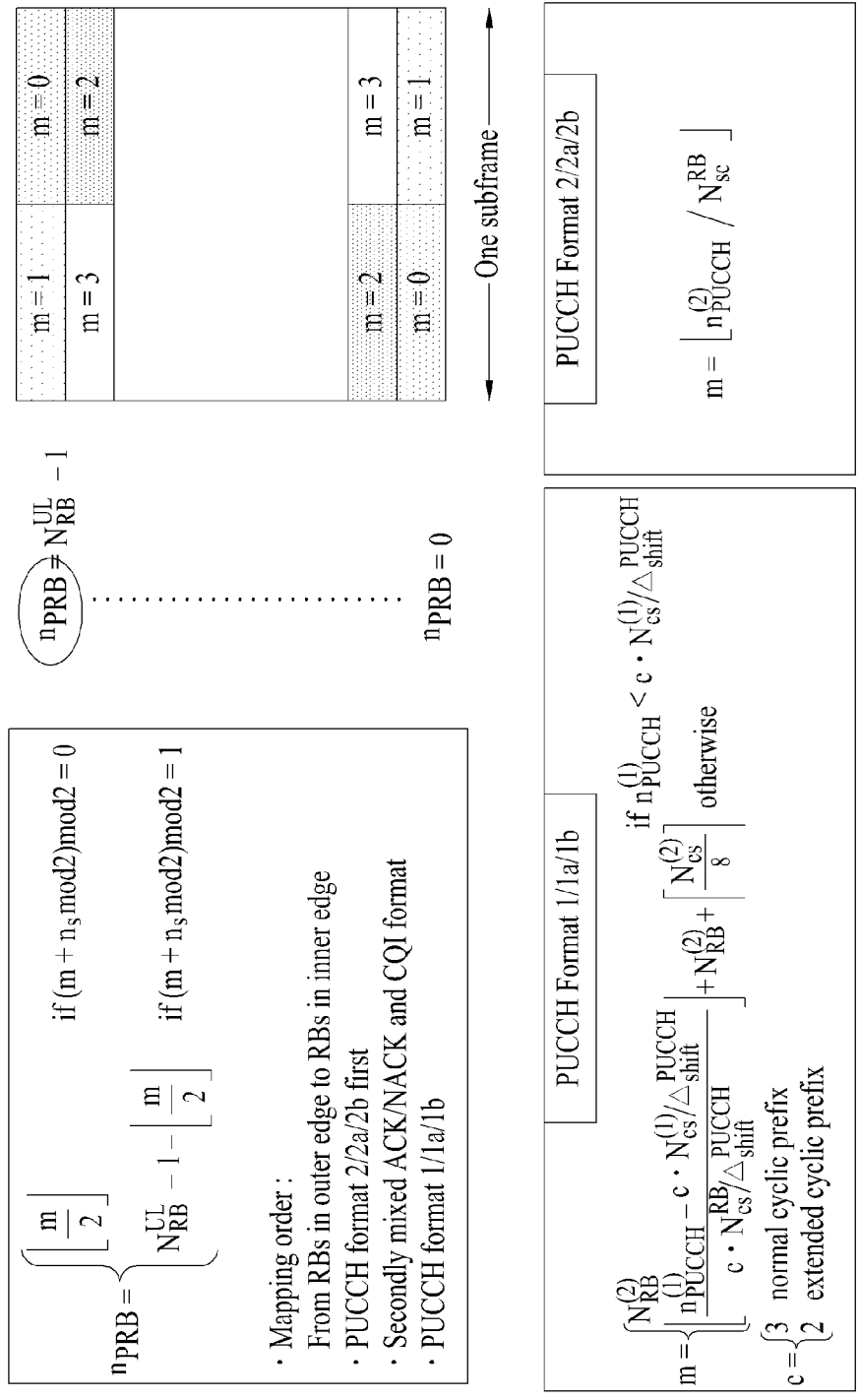
FIG. 19 illustrates allocation of a physical resource block (PRB)

FIG. 19 illustrates PRB allocation. Referring to FIG. 19, a PRB may be used to carry a PUCCH in slot $n_s$.

A multi-carrier system or Carrier Aggregation (CA) system is a system using a plurality of carriers each having a narrower bandwidth than a target bandwidth in order to support broadband. When a plurality of carriers each having a narrower bandwidth than a target band are aggregated, the bandwidth of each of the aggregated carriers may be limited to a bandwidth used in a legacy system in order to ensure backward compatibility with the legacy system. For example, the legacy LTE system supports 1.4, 3, 5, 10, 15, and 20 MHz and the LTE-A system evolved from the LTE system may support a broader bandwidth than 20 MHz using only bandwidths supported by the LTE system. Alternatively, CA may be supported by defining a new bandwidth irrespective of the bandwidths used in the legacy system. The term multi-carrier is used interchangeably with CA and spectrum aggregation. In addition, CA covers both contiguous CA and non-contiguous CA. Furthermore, CA my cover both intra-band CA and inter-band CA.

Figure 20:
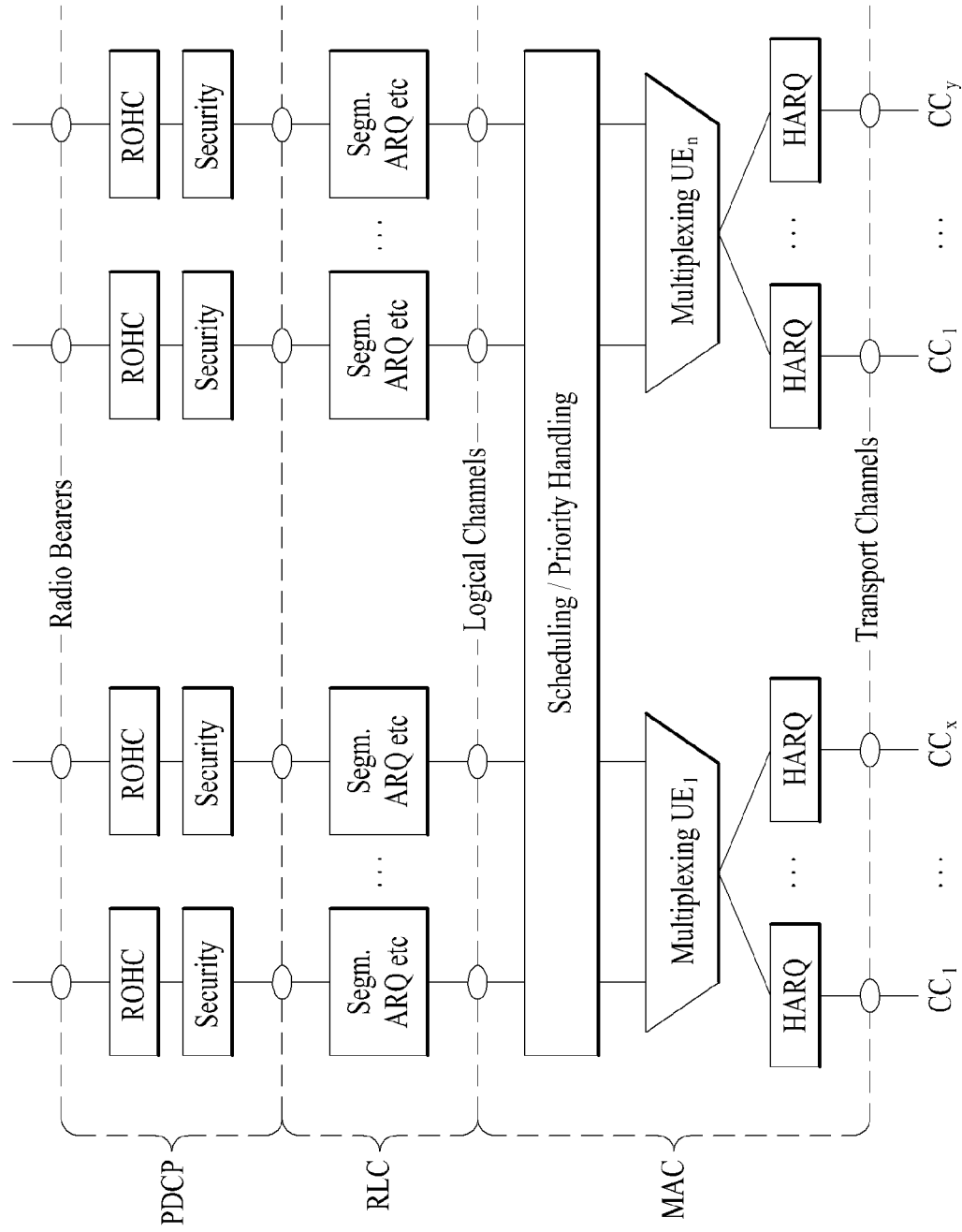
FIG. 20 is a conceptual view illustrating downlink component carrier (DL CC) management at a BS.
Figure 21:
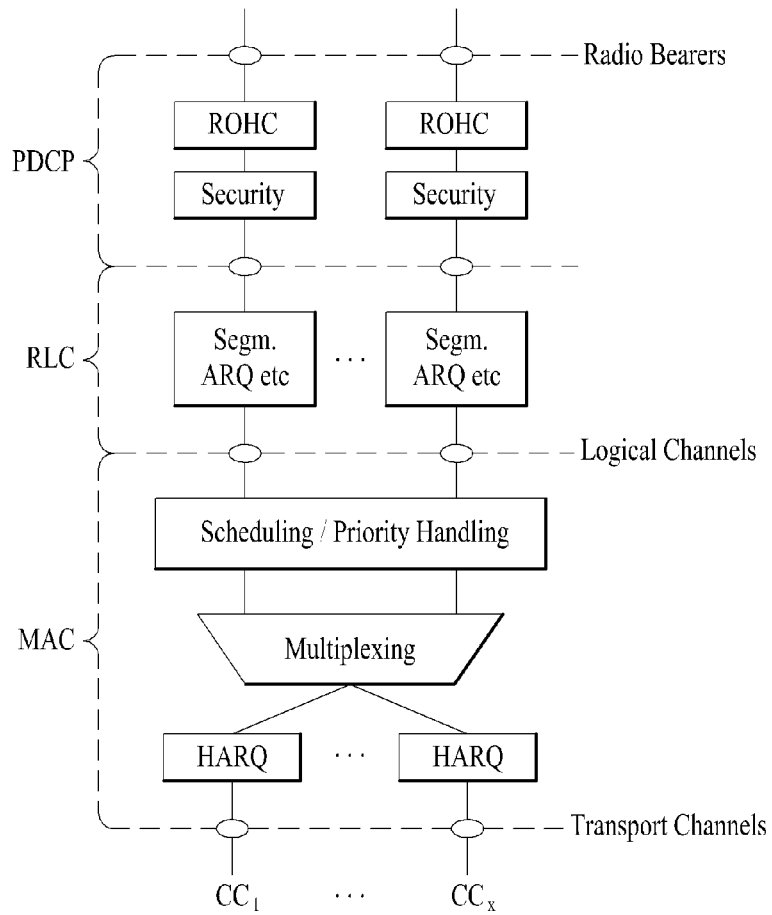
FIG. 21 is a conceptual view illustrating uplink CC (UL CC) management at a UE.

FIG. 20 is a conceptual view illustrating DL CC management at a BS and FIG. 21 illustrates a conceptual view illustrating UL CC management at a UE. For convenience, a higher layer will be referred simply as a MAC layer in FIGS. 19 and 20.

Figure 22:
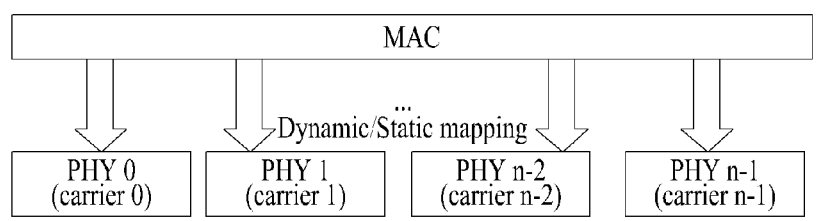
FIG. 22 is a conceptual view illustrating multi-carrier management of one medium access control (MAC) layer at a BS.
Figure 23:
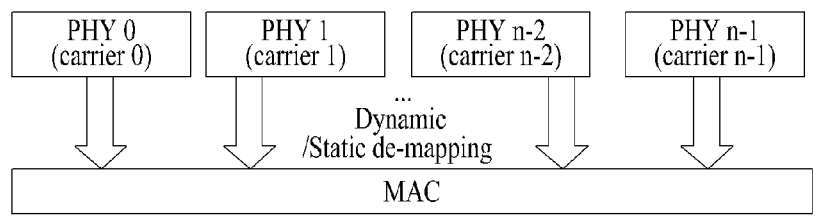
FIG. 23 is a conceptual view illustrating multi-carrier management of one MAC layer at a UE.

FIG. 22 is a conceptual view illustrating multi-carrier management of one MAC layer at a BS and FIG. 23 is a conceptual view illustrating multi-carrier management of one MAC layer at a UE.

Referring to FIGS. 22 and 23, one MAC layer performs transmission and reception by managing and operating one or more frequency carriers. Because the frequency carriers managed by the single MAC layer do not need to be contiguous, this multi-carrier management scheme is more flexible in terms of resource management. In FIGS. 22 and 23, one physical (PHY) layer refers to one CC, for convenience. Yet, a PHY layer is not necessarily an independent radio frequency (RF) device. While one independent RF device generally corresponds to one PHY layer, it may include a plurality of PHY layers.

Figure 24:
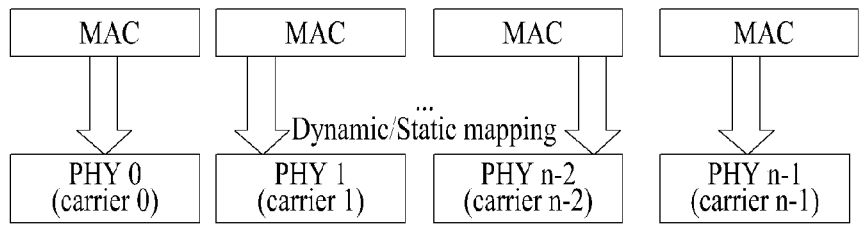
FIG. 24 is a conceptual view illustrating multi-carrier management of a plurality of MAC layers at a BS.
Figure 25:
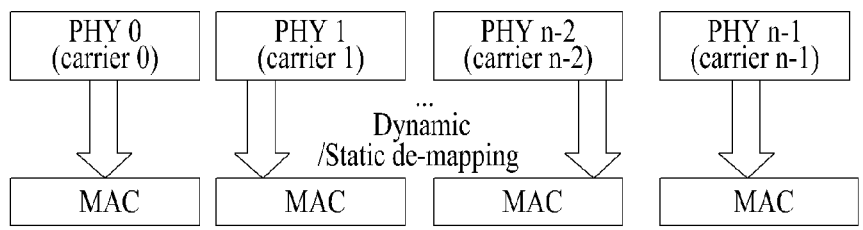
FIG. 25 is a conceptual view illustrating multi-carrier management of a plurality of MAC layers at a UE.
Figure 26:
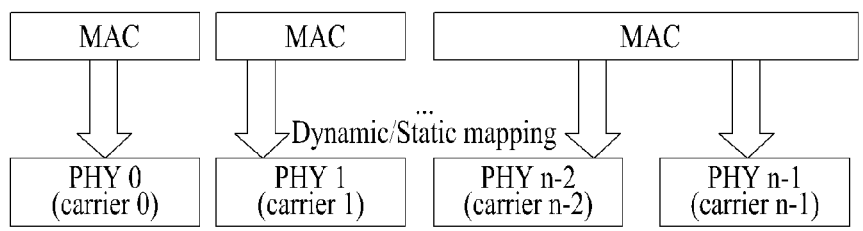
FIG. 26 is another conceptual view illustrating multi-carrier management of a plurality of MAC layers at a BS.
Figure 27:
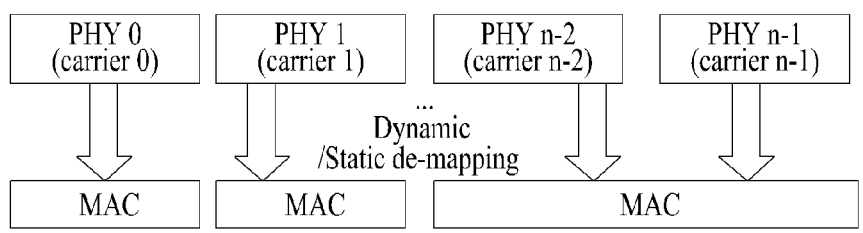
FIG. 27 is another conceptual view illustrating multi-carrier management of a plurality of MAC layers at a UE.

FIG. 24 is a conceptual view illustrating multi-carrier management of a plurality of MAC layers at a BS, FIG. 25 is a conceptual view illustrating multi-carrier management of a plurality of MAC layers at a UE, FIG. 26 is another conceptual view illustrating multi-carrier management of a plurality of MAC layers at a BS, and FIG. 27 is another conceptual view illustrating multi-carrier management of a plurality of MAC layers at a UE.

Apart from the structures illustrated in FIGS. 22 and 23, a plurality of MAC layers may control a plurality of carriers, as illustrated in FIGS. 24 to 27.

Each MAC layer may control one carrier in a one-to-one correspondence as illustrated in FIGS. 24 and 25, whereas each MAC layer may control one carrier in a one-to-one correspondence, for some carriers and one MAC layer may control one or more of the remaining carriers as illustrated in FIGS. 26 and 27.

The above-described system uses a plurality of carriers, that is, first to $N^{th}$ carriers, and the carriers may be contiguous or non-contiguous irrespective of downlink or uplink. A TDD system is configured to use N carriers such that downlink transmission and uplink transmission take place on each carrier, whereas an FDD system is configured to use a plurality of carriers for each of downlink transmission and uplink transmission. The FDD system may support asymmetrical CA in which different numbers of carriers and/or carriers having different bandwidths are aggregated for downlink and uplink.

When the same number of CCs is aggregated for downlink and uplink, all CCs can be configured with backward compatibility with the legacy system. However, CCs without backward compatibility are not excluded from the present invention.

Figure 28:
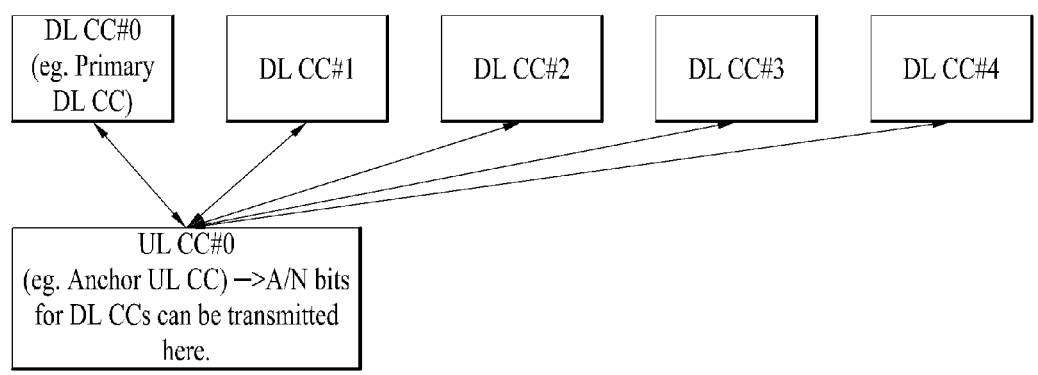
FIG. 28 illustrates asymmetrical carrier aggregation in which five downlink component carriers (DL CCs) are linked to a single uplink component carrier (UL CC)

FIG. 28 illustrates exemplary asymmetrical CA in which five DL CCs are linked to a single UL CC. This asymmetrical CA may be set from the perspective of transmitting UCI. Specific UCI (e.g. ACK/NACK responses) for a plurality of DL CCs are aggregated in a single UL CC and transmitted. When a plurality of UL CCs is configured, specific UCI (e.g. ACKs/NACKs for DL CCs) are transmitted on a predetermined UL CC (e.g., primary CC, primary cell or PCell). For convenience, if it is assumed that each DL CC can carry up to two codewords and the number of ACKs/NACKs for each CC depends on the maximum number of codewords set per CC (for example, if a BS sets up to two codewords for a specific CC, even though a specific PDCCH uses only one codeword on the CC, two ACKs/NACKs are set for the CC), at least two UL ACK/NACK bits are needed for each DL CC. In this case, to transmit ACKs/NACKs for data received on five DL CCs on a single UL CC, at least ten ACK/NACK bits are needed. If a Discontinuous Transmission (DTX) state is also to be indicated for each DL CC, at least 12 bits ($=5^6=3125=11.61$ bits) are required for ACK/NACK transmission. Since up to two ACK/NACK bits are available in the conventional PUCCH Formats 1a and 1b, this structure cannot transmit increased ACK/NACK information. While CA is given as an example of a cause to increase the amount of UCI, this situation may also occur due to an increase in the number of antennas and the existence of a backhaul subframe in a TDD system and a relay system. Like ACK/NACK transmission, the amount of control information to be transmitted is also increased when control information related to a plurality of DL CCs is to be transmitted on a single UL CC. For example, transmission of CQI/PMI/RI information related to a plurality of DL CCs may increase UCI payload. While ACK/NACK information related to codewords is described in the present invention by way of example, it is obviously to be understood that a transport block corresponding to a codeword exists and the same is applicable to ACK/NACK information for transport blocks.

In FIG. 28, a UL anchor CC (a UL PCC or a UL primary CC) is a CC that delivers a PUCCH or UCI, determined cell-specifically/UE-specifically. For example, a UE can determine a CC for which initial random access is attempted as the primary CC. A DTX state may be fed back explicitly or may be fed back so as to share the same state with a NACK.

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. Only one PCell can exist during CA in LTE-A release 10. The SCell may be configured after an RRC connection is established and may be used to provide additional radio resources. The PCell and the SCell may collectively be referred to as a serving cell. Accordingly, a single serving cell composed of a PCell only exists for a UE in RRC_Connected state, for which CA is not set or which does not support CA, On the other hand, one or more serving cells exist, including a PCell and entire SCells, for a UE in RRC_CONNECTED state, for which CA is set. For CA, a network may configure one or more SCells in addition to an initially configured PCell, for a UE supporting CA during connection setup after an initial security activation operation is initiated. Therefore, PCC is interchangeably used with PCell, primary (radio) resources, and primary frequency resources. Similarly, SCC is used interchangeably with SCell, secondary (radio) resources, and secondary frequency resources.

Now a description will be given of a method for efficiently transmitting increased UCI with reference to drawings. Specifically, a new PUCCH format, a signal processing operation, and a resource allocation method for transmitting increased UCI are proposed. The new PUCCH format proposed by the present invention is called CA PUCCH Format or PUCCH Format 3, considering that PUCCH Format 1 to PUCCH Format 2 are defined in legacy LTE Release 8/9. The technical features of the proposed PUCCH format may be applied to any physical channel (e.g. a PUSCH) that can deliver UCI in the same manner or in a similar manner. For example, an embodiment of the present invention is applicable to a periodic PUSCH structure for transmitting control information periodically or a non-periodic PUSCH structure for transmitting control information non-periodically.

The following drawings and embodiments of the present invention will be described focusing on a case in which the UCI/RS symbol structure of the legacy LTE PUCCH Format 1/1a/1b (in case of a normal CP) is used as a subframe-level/slot-level UCI/RS symbol structure applied to PUCCH Format 3. However, the subframe-level/slot-level UCI/RS symbol structure of PUCCH Format 3 is defined to provide an example, which should not be construed as limiting the present invention. The number and positions of UCI/RS symbols may be changed freely in PUCCH Format 3 of the present invention according to system design. For example, PUCCH Format 3 according to an embodiment of the present invention may be defined using the RS symbol structure of the legacy LTE PUCCH Format 2/2a/2b.

PUCCH Format 3 according to the embodiment of the present invention may be used to transmit UCI of any type or size. For example, information such as HARQ ACK/NACK, CQI, PMI, RI, and SR may be transmitted in PUCCH Format 3 according to the embodiment of the present invention. This information may have a payload of any size. For convenience, the following description will focus on transmission of ACK/NACK information in PUCCH Format 3 according to the present invention.

FIGS. 29 to 32 illustrate the structure of PUCCH Format 3 that can be used in the present invention and a signal processing operation for PUCCH Format 3. Especially, FIGS. 29 to 32 illustrate a DFT-based PUCCH format. According to the DFT-based PUCCH structure, a PUCCH is DFT-precoded and spread with a time-domain OC at an SC-FDMA level, prior to transmission. Hereinafter, the DFT-based PUCCH format will be referred to as PUCCH Format 3.

Figure 29:
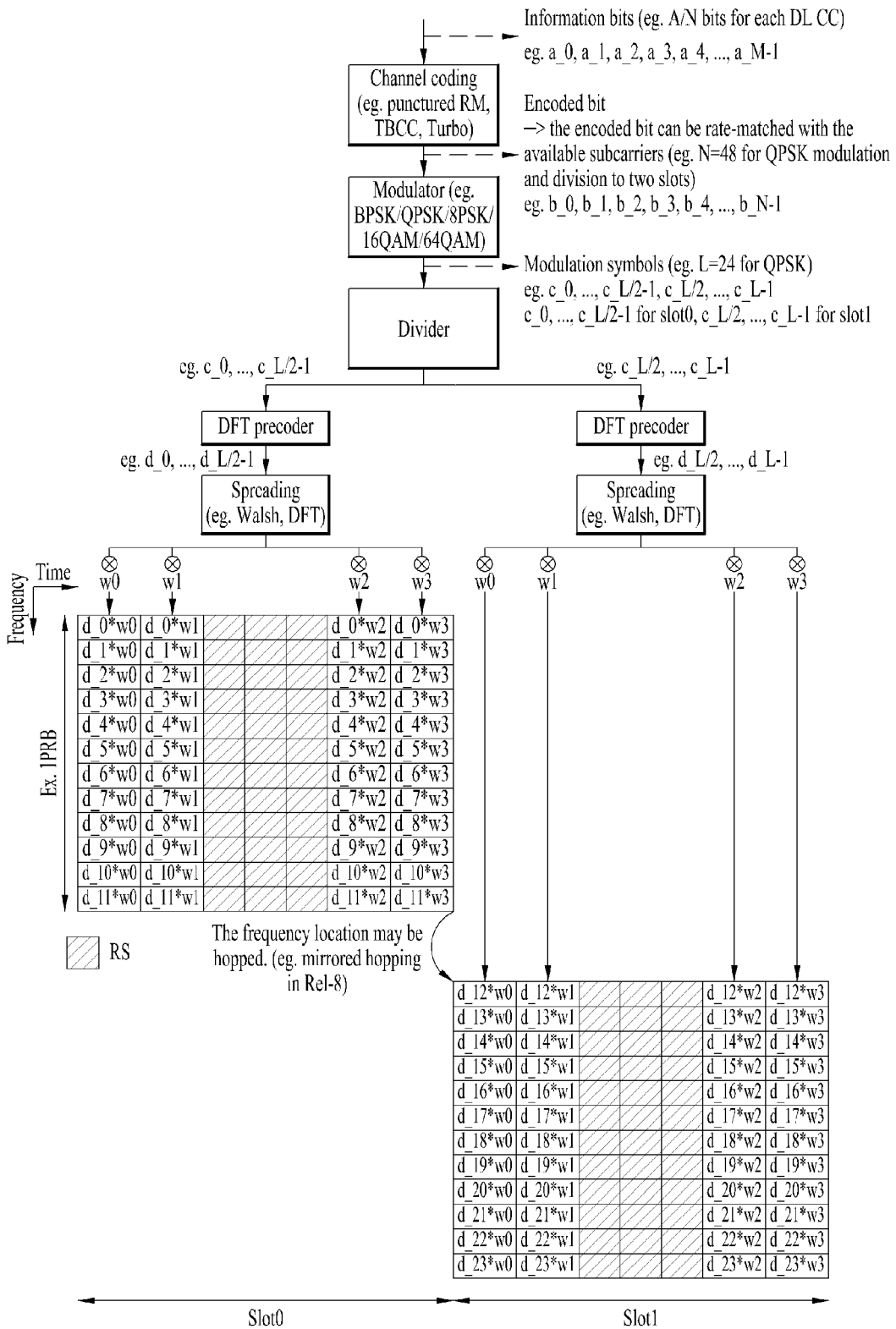
FIGS. 29 to 32 illustrate the structure of PUCCH Format 3 and a signal processing procedure for the same, to which the present invention is applied.

FIG. 29 illustrates an exemplary structure of PUCCH Format 3 using an OC with SF=4. Referring to FIG. 29, a channel coding block channel-encodes transmission bits $a\_0, a\_1, \ldots, a\_M-1$ (e.g. multiple ACK/NACK bits), thus creating coded bits (or a codeword), $b\_0, b\_1, \ldots, b\_N-1$. M is the size of transmission bits and N is the size of coded bits. The transmission bits include UCI, for example, multiple ACKs/NACKs for a plurality of data (or PDSCHs) received on a plurality of DL CCs. Herein, the transmission bits $a\_0, a\_1, \ldots, a\_M-1$ are jointly encoded irrespective of the type, number, or size of UCI that forms the transmission bits. For example, if the transmission bits include multiple ACKs/NACKs for a plurality of DL CCs, channel coding is performed on the entire bit information, rather than per DL CC or per ACK/NACK bit. A single codeword is generated by channel coding. Channel coding includes, without being limited to, repetition, simplex coding, RM coding, punctured RM coding, tail-biting convolutional coding (TBCC), low-density parity-check (LDPC) coding, or turbo coding. While not shown, the coded bits may be rate-matched, taking into account modulation order and the amount of resources. The rate matching function may be incorporated into the channel coding block or implemented in a separate functional block. For example, the channel coding block may produce a single codeword by performing (32, 0) RM coding on a plurality of pieces of control information and may subject the single codeword to cyclic buffer rate-matching.

A modulator generates modulation symbols $c\_0, c\_1, \ldots, c\_L-1$ by modulating the coded bits $b\_0, b\_1, \ldots, b\_M-1$. L is the size of modulation symbols. A modulation scheme is performed by changing the amplitude and phase of a transmission signal. The modulation scheme may be n-phase shift keying (n-PSK) or n-quadrature amplitude modulation (QAM) (n being 2 or a larger integer). More specifically, the modulation scheme may be BPSK, QPSK, 8-PSK, QAM, 16-QAM, or 64-QAM.

A divider divides the modulation symbols $c\_0, c\_1, \ldots, c\_L-1$ into slots. The order/pattern/scheme of dividing modulation symbols into slots is not limited to a specific one. For instance, the divider may divide the modulation symbols into slots, sequentially starting from the first modulation symbol (localized scheme). In this case, the modulation symbols $c\_0, c\_1, \ldots, c\_L/2-1$ may be allocated to slot 0 and the modulation symbols $c\_L/2, c\_L/2+1, \ldots, c\_L-1$ may be allocated to slot 1. When the modulation symbols are allocated to the slots, they may be interleaved (or permuted). For example, even-numbered modulation symbols may be allocated to slot 0 and odd-numbered modulation symbols may be allocated to slot 1. Division may precede modulation.

A DFT precoder performs DFT precoding (e.g. 12-point DFT) on the modulation symbols allocated to the slots in order to generate a single carrier waveform. Referring to FIG. 29, the modulation symbols $c\_0, c\_1, \ldots, c\_L/2-1$ allocated to slot 0 are DFT-precoded to $d\_0, d\_1, \ldots, d\_L/2-1$ and the modulation symbols $c\_L/2, c\_L/2+1, \ldots, c\_L-1$ allocated to slot 1 are DFT-precoded to $d\_L/2, d\_L/2+1, \ldots, d\_L-1$. DFT precoding may be replaced with another linear operation (e.g. Walsh precoding).

A spreading block spreads DFT signals at an SC-FDMA symbol level (in the time domain). The SC-FDMA symbol-level time-domain spreading is performed using a spreading code (sequence). The spreading code includes a quasi-orthogonal code and an orthogonal code. The quasi-orthogonal code includes, without being limited to, a PN (pseudo noise) code. The orthogonal code includes, without being limited to, a Walsh code and a DFT code. While an orthogonal code is taken as a main example of the spreading code herein for convenience, the orthogonal code may be replaced with a quasi-orthogonal code. The maximum value of a spreading code size (or a spreading factor (SF)) is limited by the number of SC-FDMA symbols used to transmit control information. For example, if four SC-FDMA symbols carry control information in one slot, an orthogonal code of length 4, w0, w1, w2, w3 can be used in each slot. The SF means the degree to which control information is spread. The SF may be related to the multiplexing order or antenna multiplexing order of a UE. The SF may be changed to 1, 2, 3, 4, . . . depending on system requirements. An SF may be predefined between a BS and a UE or the BS may indicate an SF to the UE by DCI or RRC signaling.

For example, if one of SC-FDMA symbols for control information is punctured to transmit an SRS, a spreading code with a decreased SF (e.g. SF=3 instead of SF=4) may be applied to the control information in a corresponding slot.

A signal generated from the above operation is mapped to subcarriers in a PRB and converted to a time-domain signal by IFFT. A CP is added to the time-domain signal and the resulting SC-FDMA symbols are transmitted through an RF end.

On the assumption that ACKs/NACKs are transmitted for five DL CCs, each operation will be described in greater detail. If each DL CC can deliver two PDSCHs, ACK/NACK bits for the PDSCHs may be 12 bits, including a DTX state. Given QPSK and time spreading with SF=4, the size of a coding block (after rate matching) may be 48 bits. The coded bits are modulated to 24 QPSK symbols and the QPSK symbols are divided into two slots, 12 QPSK symbols for each slot. The 12 QPSK symbols of each slot are converted into 12 DFT symbols by 12-point DFT, spread to four SC-FDMA symbols using an OC with SF=4 in the time domain, and then mapped. Because 12 bits are transmitted on [2 bits×12 subcarriers×8 SC-FDMA symbols], the coding rate is 0.0625 (=12/192). If SF=4, up to four UEs may be multiplexed per PRB.

Figure 30:
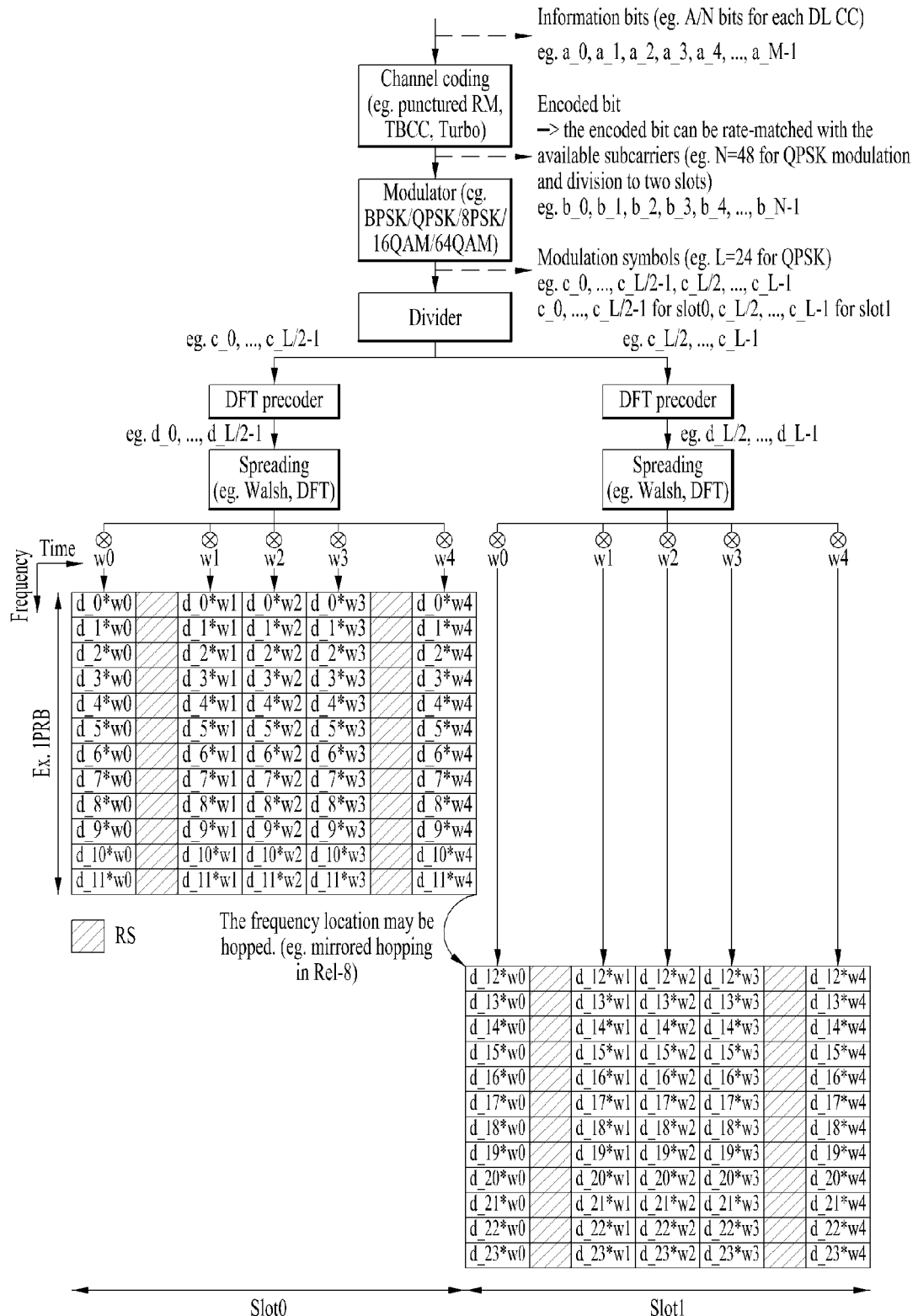

FIG. 30 illustrates an exemplary structure of PUCCH Format 3 using an OC with SF=5.

The basic signal processing operation is performed in the same manner as described with reference to FIG. 29 except for the number and positions of UCI SC-FDMA symbols and RS SC-FDMA symbols. A spreading block may be generated in advance at the front end of a DFT precoder.

In FIG. 30, RSs may be configured in the same configuration as used in the LTE system. For example, a base sequence may be cyclically shifted. The multiplexing capacity of a data part is 5 in view of SF=5. However, the multiplexing capacity of an RS part is determined by a CS interval $\Delta_{shift}^{PUCCH}$. For example, given a multiplexing capacity of $12/\Delta_{shift}^{PUCCH}$, the multiplexing capacities for the cases where $\Delta_{shift}^{PUCCH}=1$, $\Delta_{shift}^{PUCCH}=2$, and $\Delta_{shift}^{PUCCH}=3$ are respectively 12, 6, and 4. In FIG. 30, while the multiplexing capacity of the data part is 5 due to SF=5, the multiplexing capacity of the RS part is 4 in case of $\Delta_{shift}^{PUCCH}$. Therefore, overall multiplexing capacity may be limited to the smaller of the two values, 4.

Figure 31:
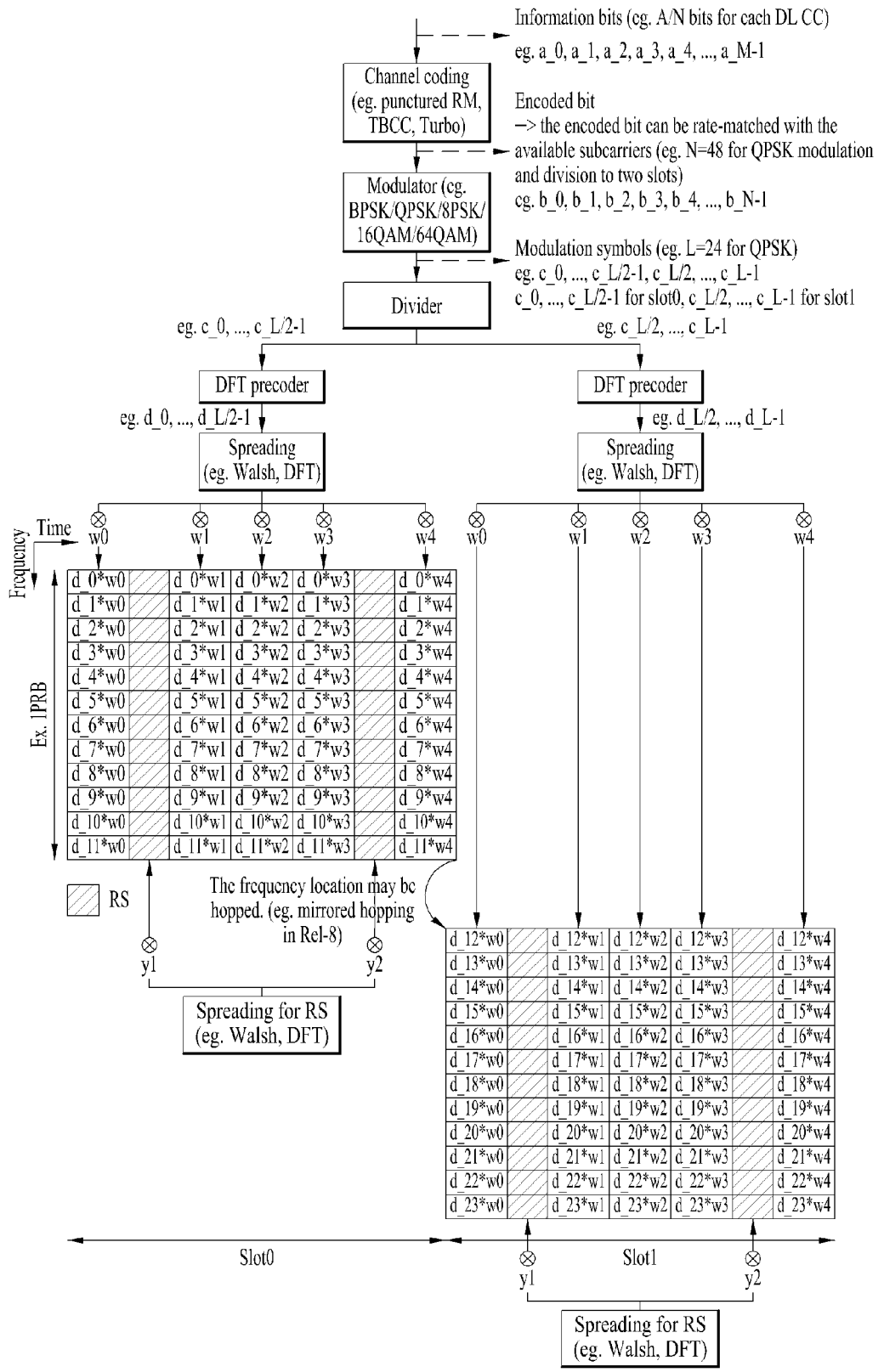

FIG. 31 illustrates an exemplary structure of PUCCH Format 3 that can increase a multiplexing capacity at a slot level.

Overall multiplexing capacity can be increased by applying SC-FDMA symbol-level spreading described with reference to FIGS. 29 and 30 to RSs. Referring to FIG. 31, the multiplexing capacity is doubled by applying a Walsh cover (or a DFT code cover) within a slot. As a consequence, the multiplexing capacity is 8 even in case of $\Delta_{shift}^{PUCCH}$, thereby preventing a decrease in the multiplexing capacity of a data part. In FIG. 31, an OC for RSs may be [y1 y2]=[1 1], [y1 y2]=[1 −1], or their modification (e.g. [j j] [j −j], [1 j] [1 −j], etc.).

Figure 32:
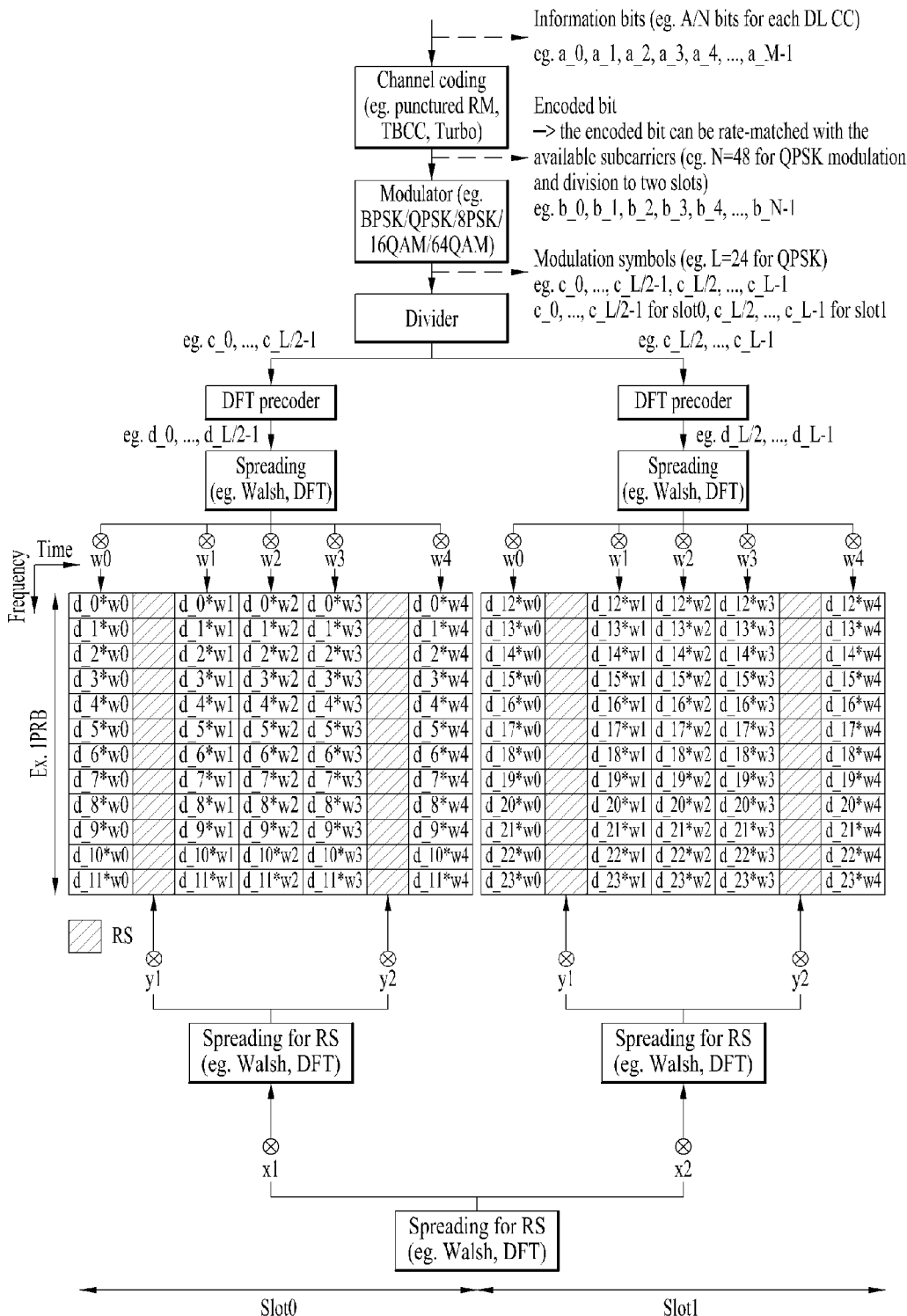

FIG. 32 illustrates an exemplary structure of PUCCH Format 3 that can increase a multiplexing capacity at a subframe level.

Without slot-level frequency hopping, use of a Walsh cover on a slot basis can further double a multiplexing capacity. As described before, [x1 x2]=[1 1], [1 −1], or a modification thereof may be used as an OC.

For reference, the processing operation of PUCCH Format 3 is not limited to the orders illustrated in FIGS. 29 to 32.

According to cross-carrier scheduling, a control channel transmitted through a primary CC schedules a data channel transmitted through the primary CC or another CC using a carrier indicator field (CIF).

Figure 33:
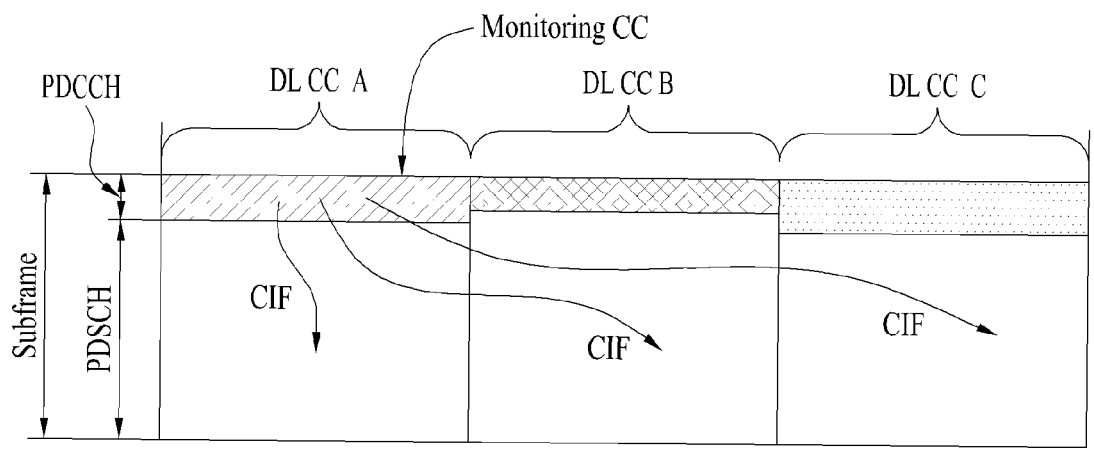
FIG. 33 illustrates an example to which cross-carrier scheduling is applied.

FIG. 33 illustrates an example to which cross-carrier scheduling is applied. In FIG. 33, three cells (or CCs) are allocated to a relay node and cross-carrier scheduling is performed using the CIF as described above. Here, downlink cell (or CC) #A is assumed to be a primary downlink CC (i.e. primary cell; PCell) and CCs #B and #C are assumed to be secondary CCs (i.e. secondary cells; SCells).

The present invention proposes a method for efficiently performing UL communication of a UE in a carrier aggregation situation in which the UE transmits/receives data through two or more frequency spectra, frequency bands or carriers.

Hereinafter, it is assumed that the UE is configured to perform communication through two CCs for convenience of description.

One of the two CCs is referred to as a primary CC (PCC or PCell) and the other is referred to as a secondary CC (SCC or SCell).

In addition, it is assumed that the UE receives control signals such as a PDCCH through the PCell and data transmission and reception of the SCell is cross-carrier-scheduled by a control signal in the PCell.

The proposed method is described based on an FDD system having CC #1 (DL PCell, LTE-A frequency band), CC #3 (UL PCell, LTE-A frequency band) and CC #2 (SCell, unlicensed band) for convenience of description.

Figure 34:
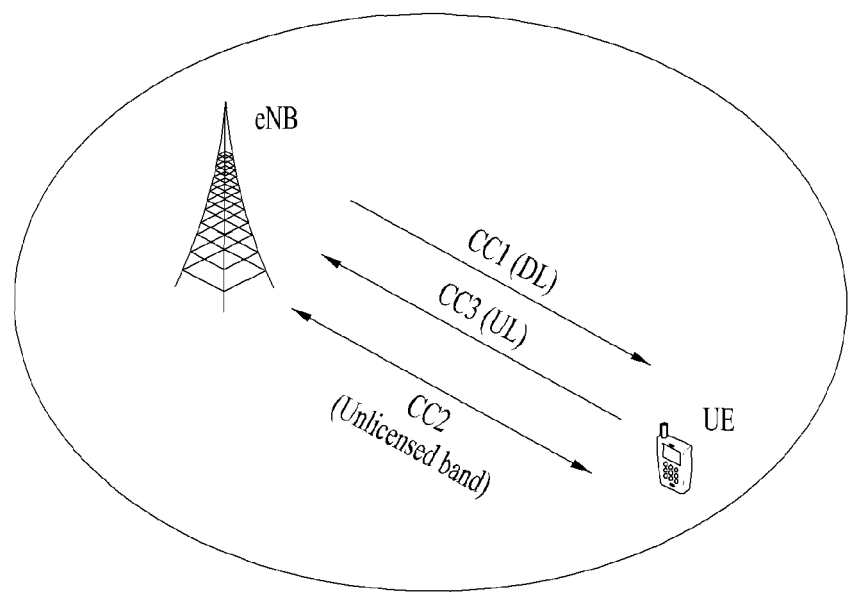
FIG. 34 illustrates an exemplary system configuration of the present invention, to which FDD is applied.

The above-described FDD system is illustrated in FIG. 34. Referring to FIG. 34, CC #1 corresponding to a DL PCell is a CC through which DL/UL scheduling grant information is transmitted and CC #3 corresponding to a UL PCell is a CC through which UL ACK/NACK and CSI (e.g. CQI and RI) are transmitted. However, methods proposed by the present invention are also applicable to a case in which CC #2 (e.g. SCell, unlicensed band) is carrier-aggregated and used in a TDD system in which DL and UL of a PCell operate in the same band.

Referring to FIG. 34, CC #2 cannot be exclusively used by a specific eNB and UE and can be used through carrier sensing (CS) based competition with another system (e.g. a non-LTE system).

Accordingly, the eNB cannot secure transmission of reference signals (e.g. common reference signal (CRS), channel state information reference signal (CSI-RS), etc.) used for the UE to generate CSI (e.g. CQI, RI and PMI) regarding CC #2 or to perform interference measurement at all times.

In the case of another system (e.g. non-LTE system), a bandwidth which is occupied at the side of the frequency domain after a result of CS operation for CC #2 is determined as 'IDLE' may not be identical to that of LTE-A.

Particularly, if a partial band used by the other system is not excluded when the UE generates CSI on CC #2 and performs interference measurement, high interference from the other system is applied and thus MCS control for DL data such as a PDSCH that will be transmitted from the eNB may not be performed.

Accordingly, the UE needs to exclude the partial band used by the other system and perform operations of generating the CSI on CC #2 and measuring interference.

In view of this, CC #2 may be carrier-aggregated and it may be assumed that a basic unit of CS operation is set to "BW_cs (e.g. BW_cs=N×RB (Hz) (N≥1 and N being an integer)) at the side of the frequency domain in the case of LTE-A system that performs communication using CC #2.

In this case, the LTE-A system may need to transmit/receive UL/DL data and to perform CSI generation and interference measurement using only a partial band instead of the entire bandwidth (e.g. BW_sys) of CC #2.

This problem may be encountered when CC #2 (e.g. SCell) is used through carrier aggregation in the TDD system in which DL and UL of a PCell operate in the same band.

Accordingly, the present invention proposes a method through which the UE generates the CSI about CC #2 and measures interference using a reference signal within a limited radio resource region on the assumption that the eNB and the UE set the basic unit of CS operation to "BW_cs" at the side of the frequency domain.

First Embodiment

The following description is based on the assumption that the UE generates the CSI on CC #2 and measures interference using a reference signal within a limited radio resource region when the UE and eNB set the basic unit of CS operation to "BW_cs" at the side of the frequency domain.

In addition, it is assumed that, if a result of CS operation performed by the eNB and UE on BW_cs (e.g. BW_cs #k) in a specific position is maintained 'IDLE' for a period "T_idle" (e.g. T_idle=1/J (ms) (J≥1 and J is an integer)), the eNB can use resources corresponding to BW_cs #k for transmission of DL data (e.g. a PDSCH) and a reference signal.

Furthermore, it is assumed that the UE can transmit UL data (e.g. a PUSCH) or receive a reference signal through resources corresponding to BW_cs #k.

A description will be given of a procedure and a method through which the UE generates the CSI on CC #2 and measures interference using a reference signal within a limited radio resource region according to an embodiment of the present invention.

The eNB may divide the entire bandwidth (e.g. BW_sys) of CC #2 into BW_cs regions at the side of the frequency domain and then perform CS operation for each BW_cs region.

When the eNB determines that a result of CS operation performed on BW_cs (e.g. BW_cs #k) in a specific position is 'BUSY', the eNB does not use resources corresponding to BW_cs #k to transmit DL data (e.g. a PDSCH) and a reference signal.

If the eNB determines that the result of CS operation performed on BW_cs (e.g. BW_cs #k) in a specific position is 'IDLE' for T_idle, the eNB uses resources corresponding to BW_cs #k to transmit DL data (e.g. a PDSCH) and a reference signal.

A detailed description will be given of a method for generating the CSI on CC #2 and measuring interference.

The eNB may transmit "known preamble (sequence)" which is previously designated as an indicator in order to signal whether resources corresponding to BW_cs #k are used for DL data (e.g. a PDSCH) or reference signal transmission to the UE. In the following description, a scheme of transmitting "known preamble (sequence)" by the eNB is referred to as option A for convenience of description.

For example, the known preamble (sequence) can be transmitted in a BW_cs region corresponding to a CSI operation result which is 'IDLE' for T_idle from among BW_cs regions.

Accordingly, the UE can regard only BW_cs from which the known preamble (sequence) is detected as a CSI reference resource, generate CSI and measure interference using only reference signals within the corresponding BW_cs region.

In addition, the UE may receive only DL data (e.g. a PDSCH) within the BW_cs region from which the known preamble (sequence) is detected.

Alternatively, reference signals used by the UE to generate the CSI on CC #2 and measure interference may be limited to reference signals within a BW_cs region (of CC #2) in which DL data (e.g. a PDSCH) is actually transmitted.

Here, the UE can be aware of the positions of BW_cs regions (of CC #2) in which DL data (e.g. a PDSCH) is actually transmitted by detecting the known preamble (sequence).

In addition to option A, the eNB may signal related information to the UE through a specific (or additional) field of a PDCCH of CC #1 (e.g. DL PCell) or a DL resource such as a PDSCH in order to inform the UE of a BW_cs region of CC #2, which is used to transmit DL data (e.g. a PDSCH) or a reference signal to the UE.

When the eNB determines that a result of CS operation performed on BW_cs (e.g. BW_cs #k) in a specific position is 'IDLE' for T_idle, the eNB may trigger aperiodic CSI reporting such that the UE generates CSI on BW_cs #k and measures interference.

Here, the eNB may trigger aperiodic CSI reporting on BW_cs #k of cell #2 through CCS in CC #1 (e.g. DL PCell). In this scheme, the eNB may additionally set a specific field (e.g. CC #1 (e.g. DL PCell)) of a PDCCH to signal information (e.g. position information) on BW_cs regions of CC #2, which correspond to the target of the aperiodic CSI report, to the UE.

In the following description, the scheme of additionally using a specific field of the PDCCH is referred to as option B for convenience of description.

In an embodiment, the UE may generate CSI and measure interference using only reference signals within a corresponding BW_cs region on the basis of information on BW_cs regions of CC #2 (e.g. SCell), which correspond to the target of the aperiodic CSI report, described above (e.g. option B).

Alternatively, the eNB may transmit DL data (e.g. a PDSCH) and a reference signal only in BW_cs regions of CC #2 (e.g. SCell) which correspond to the target of the aperiodic CSI report.

That is, a reference signal (e.g. CRS or CSI-RS) is transmitted from the eNB to the UE through an aperiodic method (or dynamic RS configuration).

In addition to the above-described option B, the UE may interpret a CSI request message transmitted from the eNB as an indicator indicating presence (or transmission) of a reference signal (e.g. CRS or CSI-RS) to implement an implicit setting operation for reference signal transmission between the eNB and the UE. In the following description, the scheme of using the CSI request message transmitted from the eNB as the indicator indicating presence (or transmission) of a reference signal is referred to as option G for convenience of description.

Alternatively, reference signals used by the UE to generate the CSI on CC #2 and measure interference may be limited to reference signals within a BW_cs region of (CC #2) in which aperiodic CSI reporting is triggered.

In the first embodiment, the UE can transmit the CSI on CC #2 and an interference measurement result to the eNB through a UL resource (e.g. a PUCCH or PUSCH) of CC #3 (e.g. UL PCell).

Alternatively, the UE may transmit the CSI on CC #2 and an interference measurement result to the eNB through a UL resource (e.g. a PUSCH) of CC #2 (e.g. SCell) scheduled by the eNB (e.g. through UL grant for cell #2 and aperiodic CSI report triggering for cell #2).

When the UE generates the CSI on CC #2 and measures interference according to the first embodiment, if strong interference leakage comes into a band region in which the UE needs to generate the CSI and measure interference from a partial band used by another system, the UE may report a specific indicator (e.g. a specific CQI index value), which is designated to indicate the interference leakage, to the eNB. This scheme is referred to as option C for convenience in the following description.

When the UE generates the CSI on CC #2 and measures interference according to the first embodiment, if the BS determines that a result of CS operation performed on BW_cs (e.g. BW_cs #k) of CC #2 (e.g. SCell) is 'IDLE' whereas the UE determines that the CS operation result is 'BUSY', the UE may report a specific indicator (e.g. a specific CQI index value), which is designated to indicate this situation, to the eNB. This is referred to as option D in the following description for convenience.

Here, the specific indicators in options C and D may reuse CQI index 0 that indicates "out of range" in LTE-A. In addition, the UE may transmit the specific indicators (e.g. specific CQI index values) to the eNB through a UL resource (e.g. a PUCCH or a PUSCH) of CC #3 (e.g. UL PCell).

When the eNB triggers an aperiodic CSI report on cell #2 through cross-carrier aggregation in CC #1 (e.g. DL PCell), the UE may signal the above-described specific indicators (e.g. indicators in options C and D) to the eNB using a PUCCH resource of CC #3 (e.g. UL PCell) linked to a CCE index of a UL grant (e.g. using on-off keying) through an aperiodic CSI report on CC #1.

Upon reception of a specific indicator (e.g. a specific CQI index value (e.g. E)), the eNB may determine that CSI (e.g. a CQI value) reported at the corresponding time is not valid and may not reflect the CSI in channel estimation value calculation.

Alternatively, the UE may not report the specific indicators to the eNB in options C and D. This is referred to as option E for convenience of description.

Here, the UE drops or omits a CSI report at the corresponding time.

When the CSI report is not received from the UE at the corresponding time, the eNB may determine that CSI at the corresponding time is not valid and may not reflect the CSI in channel estimation value calculation.

This operation may be performed by sharing related information between the eNB and the UE.

The above-described scheme (e.g. option E) is more effective when the UE reports the CSI on CC #2 and an interference measurement result through a UL resource of CC #2 scheduled by the eNB.

This is because, even if the eNB has scheduled the UL resource (e.g. a PUSCH) for cell #2 in a specific time (e.g. SF #i), UL communication of the UE cannot be secured at UL data (actual) transmission time (e.g. SF #(i+4)) following the specific time all the time since cell #2 needs to be used through CS operation based competition with the other system (e.g. non-LTE system).

Second Embodiment

In another embodiment, when the UE is configured to calculate and generate wideband CSI (e.g. CQI, RI and PMI) on CC #2 and report the wideband CSI to the eNB and a result of CS operation performed on the wideband is partially busy, the UE may generate CSI on the wideband and measure interference according to the second embodiment which is described below.

In the second embodiment, it is assumed that a basic unit of CS operation is "BW_cs" at the side of the frequency domain.

Here, the basic unit (e.g. BW_cs) of CS operation may be signaled by the eNB to the UE through higher layer signaling or previously defined as a predetermined value between the eNB and the UE.

In the following embodiment, it is assumed that the UE can use a reference signal corresponding to BW_cs #k for CSI generation and interference measurement if it is determined that a result of CS operation performed on BW_cs (e.g. BW_cs #k) is 'IDLE' for "T_idle" (e.g. T_idle=1/j (ms) (here, J≥1 and J is an integer)).

In addition, it is assumed that the UE can receive DL data (e.g. PDSCH) from the eNB through BW_cs #k that is determined as 'IDLE' for "T_idle" or transmit UL data using a resource of BW_cs #k according to UL scheduling of the eNB.

A description will be given of a procedure and a method through which the UE generates CSI on the corresponding wideband and measures interference using only reference signals corresponding to a limited radio resource region when the UE is configured to generate and report wideband CSI (e.g. CQI, RI and PMI) on CC #2 and it is determined that a result of CS operation performed on a partial region of the corresponding wideband (e.g. BW_wide) is 'BUSY'.

The UE divides the corresponding wideband (e.g. BW_wide) into BW_cs regions at the side of the frequency domain and then performs CS operation on each BW_cs region.

If the UE determines that a result of CS operation performed on a specific BW_cs (e.g. BW_cs #k) within the wideband (e.g. BW_wide) is 'BUSY', the UE does not use reference signals corresponding to BW_cs #k for CSI generation and interference measurement.

In an embodiment, the UE may not receive DL data (e.g. a PDSCH) or may not transmit UL data (e.g. a PUSCH) through BW_cs #k of CC #2, which is determined as 'BUSY'.

If the UE determines that a result of CS operation performed on a specific BW_cs (e.g. BW_cs #k) within the corresponding wideband (e.g. BW_wide) is 'IDLE', the UE may use reference signals corresponding to BW_cs #k for CSI generation and interference measurement.

Accordingly, the UE generates CSI on the wideband and measures interference using only reference signals corresponding to BW_cs (e.g. BW_cs #k) which is determined as "IDLE" from among BW_cs regions within the wideband (e.g. BW_wide).

In addition, the UE may inform the eNB of information (e.g. position (count) information) on BW_cs regions (e.g. BW_cs #k) used for the UE to generate CSI and measure interference from among BW_cs regions within the corresponding wideband (e.g. BW_wide) (or information on BW_cs regions (e.g. BW_cs #k) which are excluded from BW_cs regions within the wideband (e.g. BW_wide) when the UE generate CSI and measures interference) through a UL resource (e.g. a PUCCH or PUSCH) of CC #3 (e.g. UL PCell).

Upon reception of this information from the UE, the eNB may detect the number and positions of BW_cs regions (e.g. BW_cs #k) used for the UE to generate CSI on the wideband and measure interference.

When the number of BW_cs regions (e.g. BW_cs #k) used to generate CSI on the wideband is less than a specific value, the eNB may determine that CSI (report) on the wideband is not valid.

The above-described specific value may be signaled by the eNB to the UE through higher layer signaling or previously defined as a predetermined value between the eNB and the UE.

When the number of BW_cs regions (e.g. BW_cs #k) used for the UE to generate CSI on the wideband is less than the specific value, the UE may report a specific indicator (e.g. a specific CQI index value) indicating the situation to the eNB or drop or omit CSI report on the wideband at the corresponding time.

Here, the specific indicator may be signaled by the eNB to the UE through higher layer signaling or previously defined as a predetermined value between the eNB and the UE. According to an embodiment, the specific indicator may be transmitted from the UE to the eNB through a UL resource (e.g. a PUCCH or a PUSCH) of CC #3 (e.g. UL PCell).

The above-described dropping or omitting operation may be performed by previously sharing related information between the eNB and the UE.

In the second embodiment, the UE may transmit CSI on CC #2 and an interference measurement result to the eNB through a UL resource (e.g. a PUCCH or PUSCH) of CC #3 (e.g. UL PCell).

Alternatively, the UE may transmit the CSI on CC #2 and interference measurement result to the eNB through a UL resource (e.g. a PUSCH) of CC #2 (e.g. SCell) scheduled by the eNB.

The second embodiment may be extended and applied to any case in which the UE is configured to calculate and generate CSI on a specific band and report the CSI to the eNB and it is determined that a result of CS operation performed on the specific band is 'BUSY'.

The eNB may transmit DL data or a reference signal only through a specific BW_cs (e.g. BW_cs #k), for which a CS operation result is determined as 'IDLE', within the corresponding wideband (BW_wide) (using an aperiodic method or by setting a dynamic RS, for example).

A description will be given of applications of the present invention.

Figure 35:
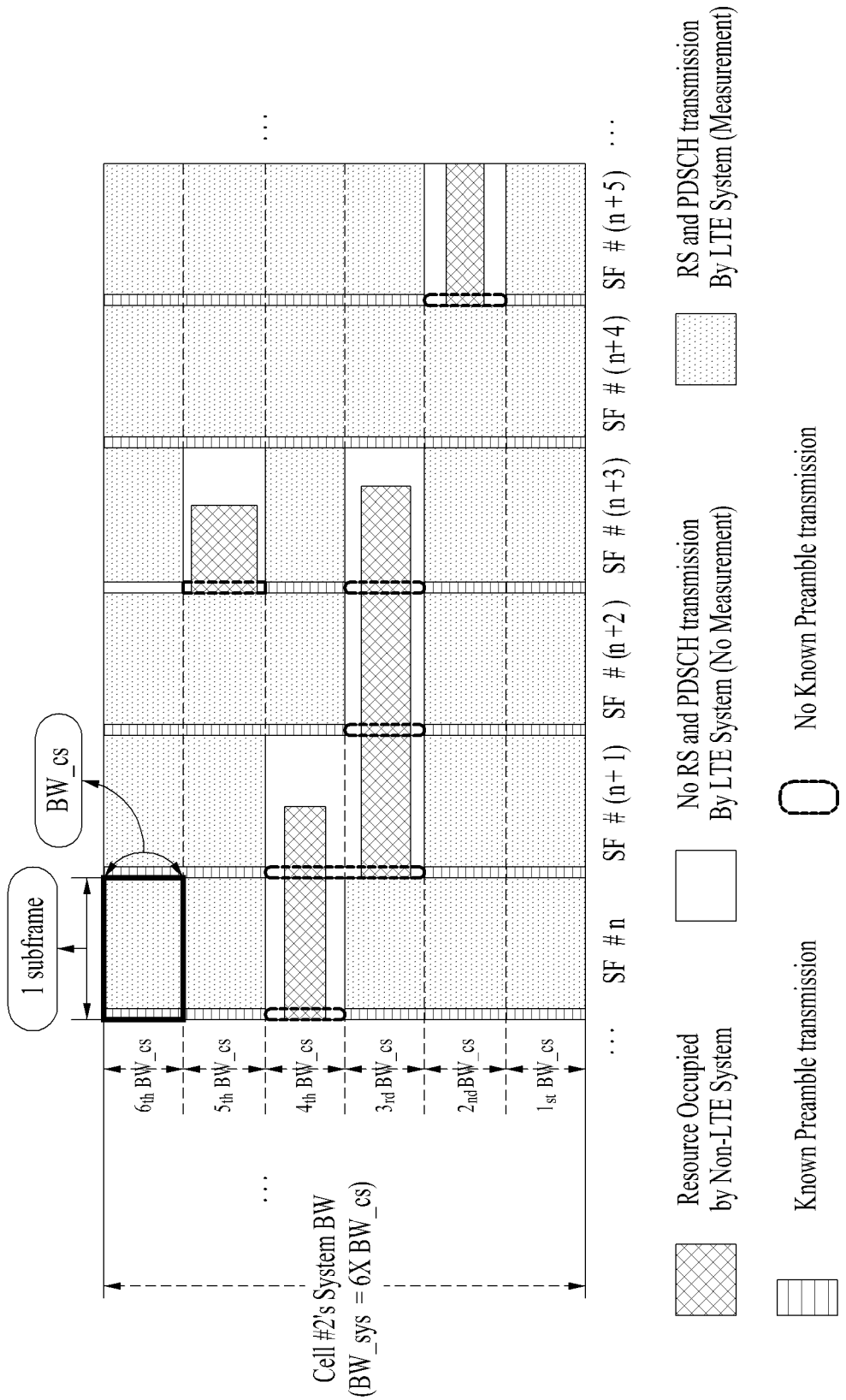
FIG. 35 illustrates an exemplary operation of a UE to generate CSI on CC #2 and measure interference using a reference signal (RS) within a limited radio resource region.

FIG. 35 illustrates an embodiment in which a UE to which the first embodiment and option A are applied generates CSI on CC #2 and measure interference using reference signals within a limited radio resource region on the assumption that the entire bandwidth of CC #2 is BW_sys (e.g. BW_sys=6× BW_cs) and the eNB and the UE perform CS operation at the side of the frequency domain having BW_cs as a basic unit of CS operation.

In FIG. 35, it is assumed that the UE regards the start point of DL data transmitted from the eNB as a point at which the above-described known preamble (sequence) is detected and regards the end point of DL data as the SF boundary of CC #1 (e.g. PCell) following and closest to the DL data start point when resources corresponding to BW_cs #k determined by the eNB as 'IDLE' are used for DL data transmission.

In addition, it is assumed that the eNB uses resources within BW_cs regions other than BW_cs regions for which CS operation results are determined as 'BUSY' for DL data and reference signal transmission.

Accordingly, the UE may regard only BW_cs regions from which the known preamble (sequence) is detected as CIS reference resources and perform operations of generating CSI on cell #2 and measuring interference using only reference signals within the corresponding BW_cs regions.

In addition, the UE may receive only DL data within the BW_cs regions from which the known preamble (sequence) is detected.

Referring to FIG. 35, the UE may receive DL data and reference signals from the eNB through BW_cs regions other than the fourth BW_cs region of SF #n, third and fourth BW_cs regions of SF #(n+1), third BW_cs region of SF #(n+2), third and fifth BW_cs regions of SF #(n+3) and second BW_cs region of SF #(n+5) and perform operations of generating the CSI on cell #2 and measuring interference using only the received reference signals.

Figure 36:
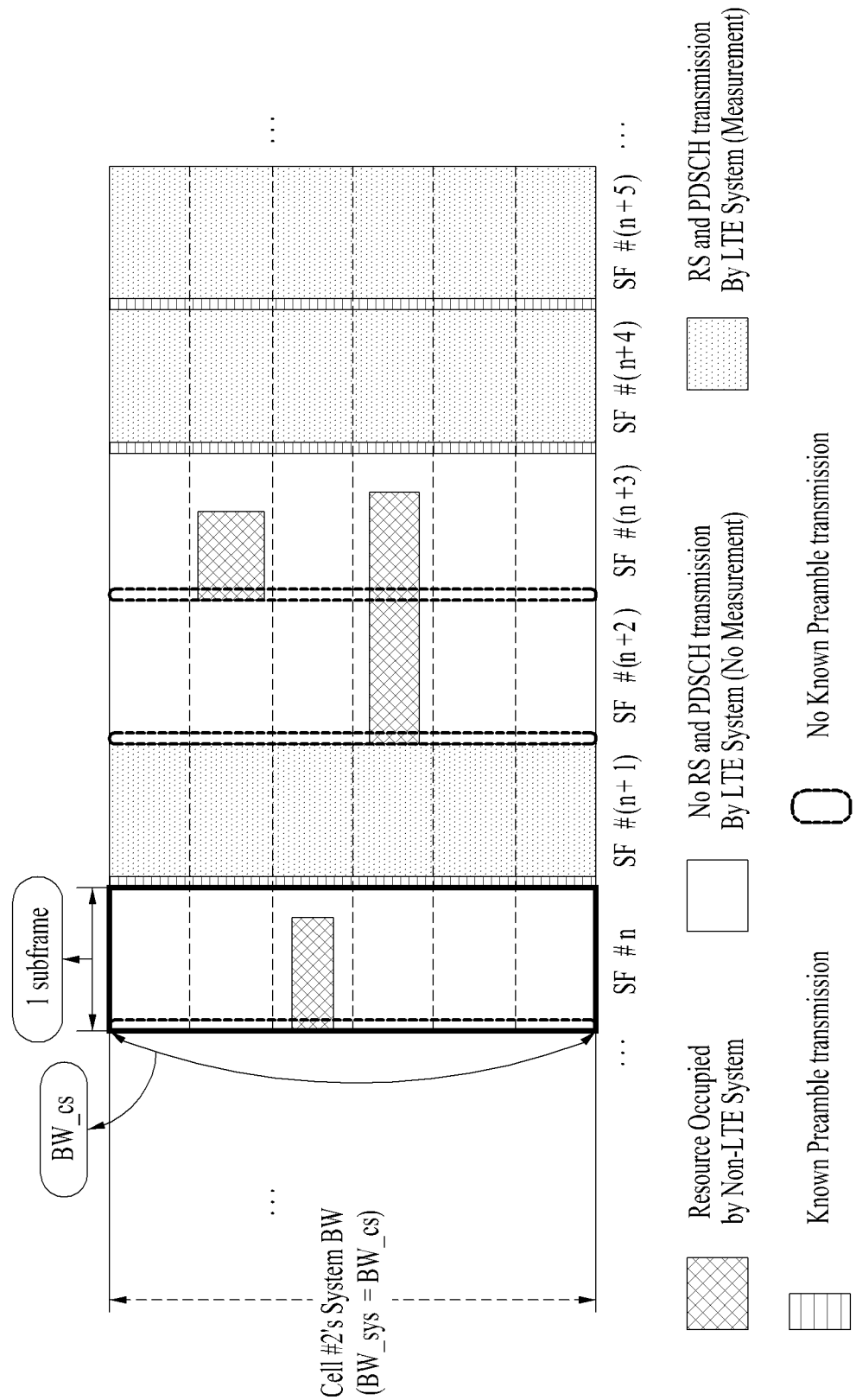
FIG. 36 illustrates another exemplary operation of the UE to generate CSI on CC #2 and measure interference using an RS in a limited radio resource region.

FIG. 36 illustrates an embodiment in which a UE to which the first embodiment and option A are applied generates CSI on CC #2 and measure interference using reference signals within a limited radio resource region when the basic unit of CS operation is set to the entire bandwidth (e.g. BW_sys) of CC #2 (e.g. BW_sys=BW_cs), distinguished from FIG. 35.

In FIG. 36, option F is applied and the UE regards only BW_cs regions from which the known preamble (sequence) is detected as CSI reference resources and performs operations of generating the CSI on cell #2 and measuring interference using only reference signals within the corresponding BW_cs regions.

In addition, the UE receives only DL data within the BW_cs regions from which the known preamble (sequence) is detected.

Referring to FIG. 36, the UE may receive DL data and reference signals from the eNB through BW_cs regions other than BW_cs regions (e.g. BW_sys) of SF #n, SF #(n+2) and SF #(n+3) and perform operations of generating the CSI on cell #2 and measuring interference using only the received reference signals.

Third Embodiment

If the eNB determines that a result of CS operation performed on CC #2 (SCell, unlicensed band) is 'IDLE', the eNB may use CC #2 for a transmission opportunity (TxOP) period corresponding to N SFs.

Here, the eNB may signal N and the purposes of the N SFs to the UE through higher layer signaling or a physical control channel or data channel.

The eNB may transmit the known preamble (sequence), which is designated to indicate information on the TxOP start point to the UE, to the UE using CC #1 or CC #2.

For example, information on N (e.g. TxOP duration) (or purposes of N SFs) may be included in the known preamble (sequence) and transmitted. If the eNB transmits DL information to the UE (LTE-A) at the SF boundary of LTE-A after transmission of the known preamble (sequence), a timing gap may be present between the known preamble (sequence) transmission time and the DL information transmission time.

In particular, since CC #2 cannot be exclusively used by the eNB and the UE and needs to be used through CS based competition, another system may attempt information transmission during the timing gap. Accordingly, the eNB may transmit a carrier reservation transport block (CRTB) using CC #2 in order to prevent the other system from attempting information transmission during the timing gap, for example. Here, the CRTB refers to "dummy information" or "a copy of part of a PUSCH" transmitted in order to reserve CC #2 as a resource of the eNB and can be transmitted during the timing gap (e.g. between the known preamble transmission time and the DL information transmission time).

Figure 37:
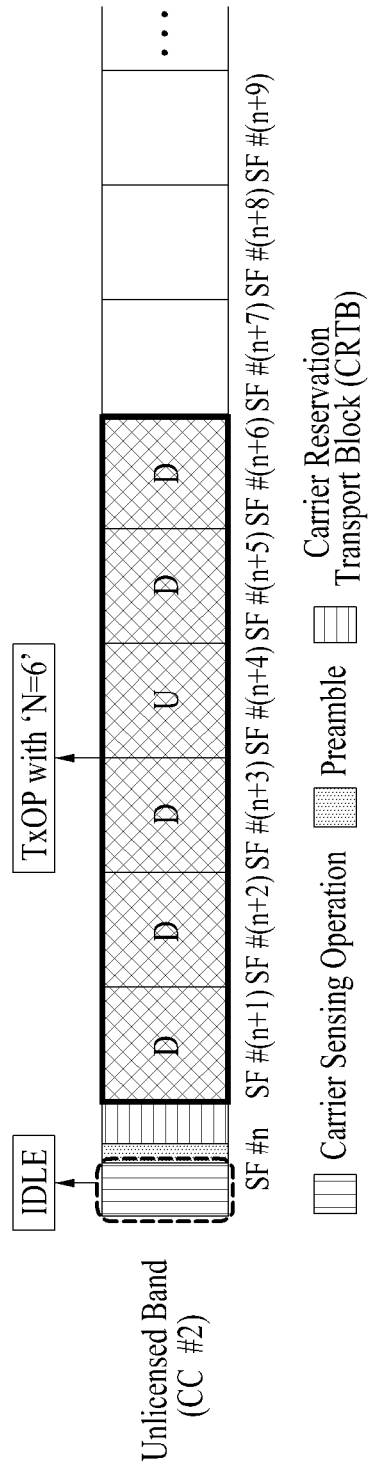
FIG. 37 illustrates an example of using CC #2 in a TxOP period corresponding to N SFs when a BS determines that a result of CS operation performed on CC #2 is idle.

FIG. 37 illustrates an embodiment of a method of using CC #2 for a TxOP period corresponding to N SFs when the eNB determines that a result of CS operation performed on CC #2 is 'IDLE'.

Here, it is assumed that the eNB respectively sets N and the purposes of the N SFs to '6' and 'DDDUDD' and signals the same to the UE through higher layer signaling.

A description will be given of a method through which the eNB generate the CSI on CC #2 and measures interference in the situation of FIG. 37.

When the UE performs operations of generating the CSI on CC #2 and measuring interference, the UE may generate the CSI on CC #2 and measure interference using only reference signals corresponding to DL SFs in the TxOP period on the assumption that reference signals valid only in the DL SFs corresponding to the TxOP period are transmitted from the eNB.

The eNB may transmit reference signals only in the corresponding DL SFs from among the N SFs constituting the TxOP in order to support the operations of the UE to generate the CSI on CC #2 and measure interference.

The UE may regard only a reference signal in a DL SF in which DL data is actually transmitted from among the DL SFs corresponding to the TxOP period as a valid reference signal and use the valid reference signal for operations of generating the CSI on CC #2 and measuring interference.

In addition, the UE may regard only a reference signal in a DL SF in which the eNB triggers an aperiodic CSI report on cell #2 through cross-carrier scheduling, from among the DL SFs corresponding to the TxOP period, as a valid reference signal and use the valid reference signal for operations of generating the CSI on CC #2 and measuring interference.

In the third embodiment, the UE may transmit the CSI on CC #2 and an interference measurement result to the eNB through a UL resource of CC #3.

Otherwise, the UE may transmit the CSI on CC #2 and the interference measurement result to the eNB through a UL resource of CC #2 scheduled by the eNB.

FIG. 38 illustrates an embodiment in which the third embodiment is applied to a case in which the UE generates the CSI on CC #2 and measures interference in the same situation (e.g. N=6 and the purposes of the N SFs are 'DDDUDD') as in FIG. 37.

Here, the UE generates the CSI on CC #2 and measures interference using only reference signals valid in DL SFs corresponding to the TxOP period on the assumption that the reference signals valid in the DL SFs are transmitted from the eNB.

In FIG. 38, the eNB transmits reference signals only in the corresponding DL SFs from among the N SFs constituting the TxOP.

The third embodiment may be applied along with the above-described proposed schemes (e.g. the first embodiment, second embodiment and options A to G) and extended and applied to any case in which a result of CS operation performed on a specific band represents that part of the specific band is 'BUSY'.

The above-described embodiments of the present invention may be extended and applied to a case in which two or more CCs are aggregated in an FDD or TDD system.

Furthermore, the above-mentioned proposed schemes may be extended and applied to a case in which only the eNB performs CS operation as well as a case in which both the eNB and the UE perform CS operation.

Additionally, the above-described proposed schemes may be extended and applied to "case in which only the eNB performs CS operation", "case in which only the UE performs CS operation" or "case in which both the eNB and the UE perform CS operation".

Moreover, the above-mentioned proposed schemes may be extended and applied even when the UE transmits a sounding reference signal (SRS) to the eNB for UL channel estimation for CC #2.

That is, the UE can perform (aperiodic or periodic) SRS transmission only in UL SFs in the TxOP period. If the UE is configured to perform (aperiodic or periodic) SRS transmission in a UL SF other than the TxOP period, the UE drops or omits SRS transmission.

If the UE is configured to perform (aperiodic or periodic) SRS transmission in a UL SF other than the TxOP period, the UE may transmit a corresponding SRS in a UL SF in a TxOP period following and closest to the corresponding UL SF.

The embodiments of the present invention may be extended and applied to not only a case in which specific radio resources (e.g. frequency/time resources) whose purposes are undecided are carrier-aggregated and used but also a case in which the radio resources are independently used.

In addition, the embodiments of the present invention may be extended and applied to a case in which the purpose of a (predefined) specific resource of each CC used for communication between a receiver and a transmitter is varied according to system load state in a carrier aggregation environment.

Furthermore, the embodiments of the present invention may be extended and applied to any case in which PDCCH or E-PDCCH based communication is performed.

Moreover, the embodiments of the present invention may be extended and applied to a case in which extension carriers are additionally aggregated and used for communication.

Additionally, the proposed schemes may be extended and applied to a case in which D2D (device-to-device) communication is performed in a specific band allocated for D2D communication or the purpose of a (cell) specific radio resource is changed and the specific radio resource is (re)used for D2D communication.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by subsequent amendment after the application is filed.

In the embodiments of the present invention, a description is made, centering on a data transmission and reception relationship between a BS and a UE. A specific operation described as performed by the BS may be performed by an upper node of the BS. That is, it is apparent that, in a network composed of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'Mobile Station (MS)', 'Mobile Subscriber Station (MSS)', 'Subscriber Station (SS)', etc.

The embodiments of the present invention may be achieved by various means, for example, hardware, firmware, software, or a combination thereof. In a hardware configuration, the methods according to the embodiments of the present invention may be achieved by one or more ASICs (application specific integrated circuits), DSPs (digital signal processors), DSPDs (digital signal processing devices), PLDs (programmable logic devices), FPGSs (field programmable gate arrays), processors, controllers, microprocessors, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method for transmitting control information in a wireless communication system and a device for the same have been described focusing on examples applied to 3GPP LTE, the method and device can be applied to various wireless communication systems in addition to 3GPP LTE.

The invention claimed is:

1. A method for a base station to receive channel state information from a user equipment (UE) configured with a primary component carrier (CC) and a secondary CC in a wireless communication system, the method comprising:
dividing bandwidth of the secondary CC configured for the base station and the UE, into a plurality of subbands;
carrying out a carrier sensing (CS) operation for each of the plurality of subbands of the secondary CC;
when a result of the CS operation for a first subband from among the plurality of subbands indicates that the first subband is maintained in an idle state for a predetermined time or longer,
transmitting, to the UE, downlink data, a reference signal and a first indicator on the first subband, the first indicator indicating that the first subband is used to transmit the downlink data and the reference signal on the first subband, and
transmitting, to the UE, a second indicator in the primary CC, the second indicator triggering a transmission of the channel state information to the UE; and
receiving, from the UE, channel state information related to the downlink data and the reference signal transmitted only on the first subband of the secondary CC.

2. The method according to claim 1, wherein the first indicator includes a predetermined sequence transmitted in the first subband.

3. The method according to claim 1, wherein the first indicator is transmitted through downlink control information or downlink data transmitted in the primary CC.

4. The method according to claim 1, wherein the channel state information is received in an uplink (UL) primary CC.

5. The method according to claim 1, wherein the channel state information is received in an uplink radio resource of the secondary CC.

6. The method according to claim 1, wherein the second indicator further comprises information indicating that the first subband is used to transmit the downlink data and the reference signal.

7. The method according to claim 1, wherein when an amount of interference for the first subband exceeds a threshold, the channel state information includes a predetermined value of channel quality indicator (CQI) index.

8. The method according to claim 7, wherein when the predetermined value of CQI index is received, the channel state information is not applied to a channel estimation for the first subband.

9. A method for a user equipment (UE) configured with a primary component carrier (CC) and a secondary CC to transmit channel state information to a base station in a wireless communication system, the method comprising:
when a result of a carrier sensing (CS) operation for a first subband from among the plurality of subbands indicates that the first subband is maintained in an idle state for a predetermined time or longer,
receiving, from the base station, downlink data, a reference signal and a first indicator on the first subband from among a plurality of subbands of the secondary CC, the first indicator indicating that the first subband is used to transmit the downlink data and the reference signal on the first subband, and
receiving, from the base station, a second indicator in a downlink (DL) primary component carrier, the second indicator triggering a transmission of the channel state information to the UE;
measuring channel state related to only the downlink data and the reference signal received on the first subband indicated by the first indicator; and
transmitting, to the base station, information on the measured channel state.

10. The method according to claim 9, wherein the first indicator includes a predetermined sequence transmitted in the first subband.

11. The method according to claim 9, wherein the first indicator is received through downlink control information or downlink data transmitted in a downlink (DL) primary CC.

12. The method according to claim 9, wherein the channel state information is transmitted in an uplink (UL) primary CC.

13. The method according to claim 9, wherein the channel state information are transmitted in an uplink radio resource of the secondary CC.

14. The method according to claim 9, wherein the second indicator further comprises information indicating that the first subband is used to transmit the downlink data and the reference signal.

15. The method according to claim 9, wherein when an amount of interference for the first subband exceeds a threshold, the channel state information includes a predetermined value of channel quality indicator (CQI) index.

16. The method according to claim 15, wherein when the predetermined value of CQI index is received, the channel state information is not applied to a channel estimation for the first subband.

17. A user equipment (UE) configured with a primary component carrier (CC) and a secondary CC for transmitting channel state information to a base station in a wireless communication system, the UE comprising:
a reception module;
a transmission module; and
a processor configured to:
control the reception module to, when a result of a carrier sensing (CS) operation for a first subband from among the plurality of subbands indicates that the first subband is maintained in an idle state for a predetermined time or longer, receive, from the base station, downlink data, a reference signal and a first indicator on the first subband from among a plurality of subbands of the secondary CC, the first indicator indicating that the first subband is used to transmit the downlink data and the reference signal from the base station, and receive, from the base station, a second indicator in a downlink (DL) primary component carrier, the second indicator triggering a transmission of the channel state information to the UE, measure channel state related to the downlink data and the reference signal received only on the first subband indicated by the first indicator, and control the transmission module to transmit, to the base station, information on the measured channel state.

18. The method according to claim 1, wherein the secondary CC operates on unlicensed bands.

19. The method according to claim 9, wherein the secondary CC operates on unlicensed bands.

* * * * *